US007010593B2

(12) United States Patent
Raymond

(10) Patent No.: US 7,010,593 B2
(45) Date of Patent: Mar. 7, 2006

(54) DYNAMIC GENERATION OF CONTEXT-SENSITIVE DATA AND INSTRUCTIONS FOR TROUBLESHOOTING PROBLEM EVENTS IN A COMPUTING ENVIRONMENT

(75) Inventor: Robert Raymond, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 09/845,429

(22) Filed: Apr. 30, 2001

(65) Prior Publication Data

US 2002/0161875 A1   Oct. 31, 2002

(51) Int. Cl.
*G06F 15/173* (2006.01)

(52) U.S. Cl. .................. 709/224; 709/220; 709/223; 714/4; 714/25; 714/49; 715/736

(58) Field of Classification Search ............... 709/203, 709/220–229; 706/47, 60; 714/4, 25, 26, 714/44, 46, 49; 715/736
See application file for complete search history.

(56) References Cited

U.S. PATENT DOCUMENTS

| 5,596,712 | A | * | 1/1997 | Tsuyama et al. ............... 714/26 |
|---|---|---|---|---|
| 5,715,374 | A | * | 2/1998 | Heckerman et al. .......... 706/46 |
| 5,771,352 | A | * | 6/1998 | Nakamura et al. .......... 709/227 |
| 5,889,990 | A |   | 3/1999 | Coleman et al. |
| 5,903,626 | A | * | 5/1999 | Iglehart et al. ............... 379/28 |
| 6,032,184 | A | * | 2/2000 | Cogger et al. .............. 709/223 |
| 6,061,505 | A | * | 5/2000 | Pitchaikani et al. ......... 709/226 |
| 6,144,991 | A | * | 11/2000 | England ..................... 709/205 |
| 6,260,160 | B1 | * | 7/2001 | Beyda et al. ................. 714/27 |
| 6,275,855 | B1 | * | 8/2001 | Johnson ..................... 709/224 |
| 6,321,262 | B1 | * | 11/2001 | Springer .................... 709/223 |
| 6,349,305 | B1 |   | 2/2002 | Hara et al. |
| 6,393,387 | B1 | * | 5/2002 | Adriaans et al. ............ 709/224 |
| 6,397,245 | B1 | * | 5/2002 | Johnson et al. ............. 709/224 |
| 6,418,469 | B1 | * | 7/2002 | Justice et al. ............... 709/224 |

(Continued)

*Primary Examiner*—David Wiley
*Assistant Examiner*—Phuoc H. Nguyen

(57) ABSTRACT

A system and method for dynamically providing information to an administrator of a computing environment such as an administrator of a network system that is relevant to a particular problem event. This information includes contextual instructions and diagnostic data that will assist the network administrator in the analysis of the problem event. Generally, the invention automatically obtains from relevant computing environment entities pertinent information likely to be necessary to troubleshoot the particular problem event. The context-sensitive information is presented dynamically on a display for consideration and interaction by the network administrator. Specifically, the invention includes a database of executable troubleshooting (TS) profiles each specifically designed for a particular type of problem event. Each such TS profile references one or more troubleshooting data miner modules included in a library of such modules that accesses particular hardware or software entities in the network system for particular information. When a TS profile is invoked to assist a network administrator troubleshoot a particular type of problem event, the referenced data miner modules are executed and generate or cause the generator of troubleshooting instructions and diagnostic data which is then displayed to the network administrator.

25 Claims, 33 Drawing Sheets

U.S. PATENT DOCUMENTS

| | | | |
|---|---|---|---|
| 6,445,774 B1 * | 9/2002 | Kidder et al. | 379/9.03 |
| 6,487,513 B1 * | 11/2002 | Eastvold et al. | 709/224 |
| 6,505,245 B1 * | 1/2003 | North et al. | 709/223 |
| 6,529,954 B1 * | 3/2003 | Cookmeyer, II et al. | 709/224 |
| 6,535,865 B1 * | 3/2003 | Skaaning et al. | 370/389 |
| 6,556,986 B1 | 4/2003 | Hara et al. | |
| 6,650,949 B1 * | 11/2003 | Fera et al. | 714/26 |
| 6,665,820 B1 * | 12/2003 | Frowein et al. | 714/43 |
| 6,691,134 B1 * | 2/2004 | Babula et al. | 707/104.1 |
| 6,782,388 B1 * | 8/2004 | Majewski et al. | 707/10 |
| 6,799,198 B1 * | 9/2004 | Huboi et al. | 709/224 |
| 6,883,118 B1 * | 4/2005 | Morgan et al. | 714/43 |
| 6,898,580 B1 | 5/2005 | Curran et al. | |

* cited by examiner

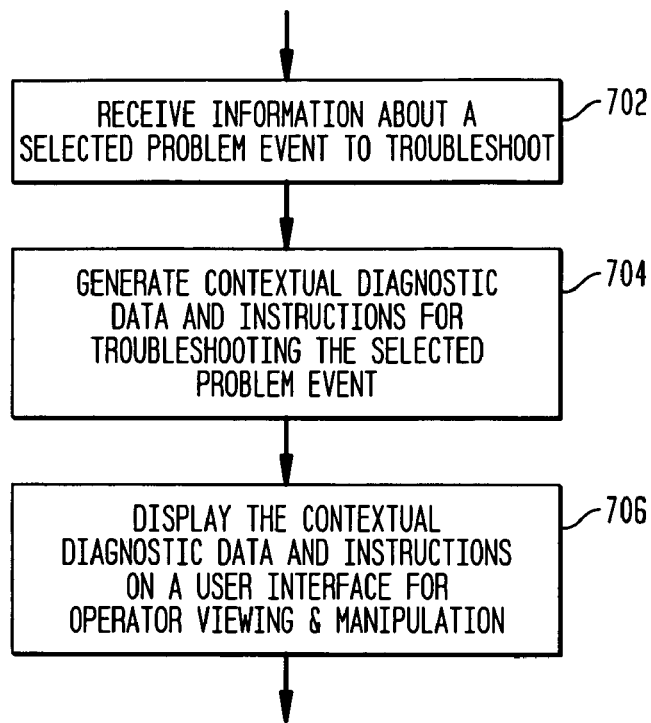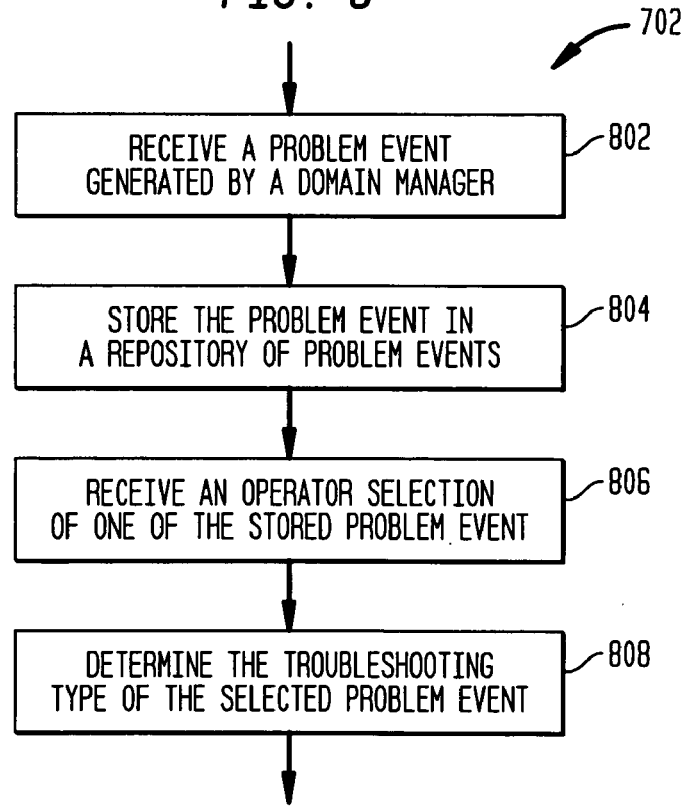

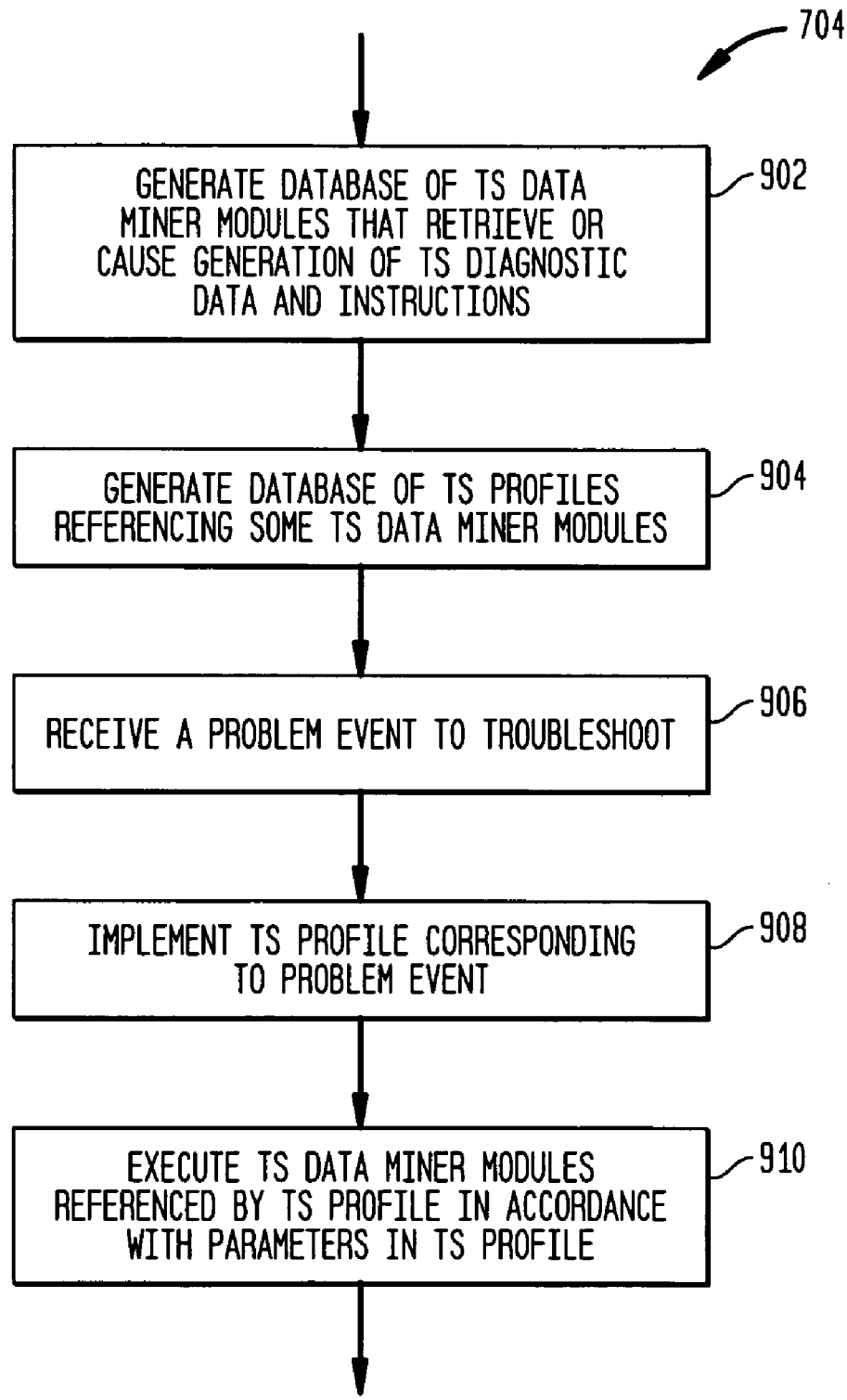

TS PROFILE
1200

FIG. 12A

TS PROFILE
1200

```
1    d<?xml version="1.0" encoding="UTF-8"?>                              HEADER
2    <!DOCTYPE PortalView SYSTEM "PortalView.dtd">                        1202
3    <PortalView
4    colorScheme="/OvSipDocs/styles/default.css"                          VIEW WINDOW
5    defaultSheetID="Troubleshoot" refreshRate="3600"                     ATTRIBUTES
6    showDateTime="yes" showUserName="yes"                                1204
7    userName="Any User">
8      <Sheet id="Troubleshoot" title="Connectivity
9    Troubleshooting">
10     <Column width="narrow">
11       <ModuleInstance                                                  TS MODULE
12   classid="com.hp.ov.portal.modules.service.SvcCardServ                 REFERENCE
13   let" display="yes" rollupState="down"id="my6"                        1206A
14   help="/OvSipDocs/C/help/SvcCard/cardView.htm"
15   title="Impacted Services">
16         <ServiceCard details="no" server="bacchusn">
17           <ServiceRef name="email"/>
18         </ServiceCard>
19       </ModuleInstance>
20       <ModuleInstance                                                  TS MODULE
21   classid="com.hp.ov.portal.modules.ovgeneric"                          REFERENCE
22   display="yes"                                                        1206B
23   help="/OvSipDocs/C/help/examples/integ.html"
24   id="Generic100" rollupState="down" title="Impacted
25   Customers">
26         <Generic>
27           <Submodule>
28             <TitleBar title="Gold Customers"/>
29             <EmbeddedHtml
30   data="<strong>VIC1</strong>"/>
31           </Submodule>
32           <Submodule>
33             <TitleBar title="Silver Customers"/>
```

FIG. 12B

TS PROFILE
1200

```
34        <EmbeddedHtml
35  data="<strong>Cust1<br>Cust4<br>C
36  ust6</strong>"/>
37        <Submodule>
38        </Generic>
39      </ModuleInstance>
40      <ModuleInstance
41  classid="com.hp.ov.portal.modules.vpis" display="yes"
42  help="/OvSipDocs/C/help/VPIS/VPISView.html"
43  id="module9" rollupState="down" title="Internet
44  Services">
45        <VPIS days="30" hours="1">
46          <ServiceType availability="yes"
47  availabilityReport="no" name="IMAP4-Email Service"
48  responseTime="no" responseTimeComponents="no"
49  serviceLevelViolations="yes"
50  serviceLevelViolationsReport="no"/>
51        </VPIS>
52      </ModuleInstance>
53      <ModuleInstance
54  classid="com.hp.ov.portal.modules.health"
55  display="yes"
56  help="/OvSipDocs/C/help/nmHealth/healthView.html"
57  id="module25" rollupState="down" title="Network
58  Health">
59        <NetworkHealth showRawData="no"
60  showUnknown="no">
61          <Summary display="yes" displayDepth="3"
62  id="Summary6" title="mailserver6.acme.com Health">
63            <Component href="#IfHealth" vital="no"
64  weight="1"/>
65            <NodeSelection id="Servers" op="AND"
66  title="Servers">
67              <IPHostFilter op="OR">
```

- TS MODULE REF 1206B (CONT)  (lines 34–39)
- TS MODULE REF 1206C  (lines 40–52)
- TS MODULE REF 1206D  (lines 53–67)

FIG. 12C

TS PROFILE
1200

```
68        <IPHost
69   hostname="coleman.cnd.hp.com"/>
70        </IPHostFilter>
71      </NodeSelection>
72     </Summary>
73    </NetworkHealth>
74   </ModuleInstance>
75   <ModuleInstance
76   classid="com.hp.ov.portal.modules.bookmarks"
77   display="yes"
78   help="/OvSipDocs/C/help/bookMark/bookmkView.html
79   "id="my1450" rollupState="down" title="Reports">
80     <Bookmarks>
81      <Entry
82   href="http://sushi.bbn.hp.com/OvSipDocs/C/reports/ito_
83   service_history_yesterday/default.htm"
84   target="bookmarkwin" title="Services"/>
85      <Entry
86   href="http://sushi.bbn.hp.com/OvSipDocs/C/reports/ito_
87   service_severities/default.htm" target="bookmarkwin"
88   title="Availability"/>
89      <Entry
90   href="http://sushi.bbn.hp.com/OvSipDocs/C/reports/ito_
91   service_history_yesterday_horizontal/default.htm"
92   target="bookmarkwin" title="Performance"/>
93     </Bookmarks>
94    </ModuleInstance>
95    </Column>
96    <Column width="wide">
97     <ModuleInstance
98   classid="com.hp.ov.portal.modules.ovgeneric"
99   display="yes" id="Trouble1" rollupState="down"
100  title="Event Information">
101     <Generic>
102      <Submodule>
```

TS MODULE REF
1206D (CONT)

TS MODULE REF
1206E

TS MODULE REF
1206F

FIG. 12D

TS PROFILE
1200

```
103         <TitleBar title="Event Details"/>
104         <File displayFileInfo="no"
105  fileName="$SIP_HOME_DIRconf/share/events/detailsA
106  "stripHtmlHeader="no"type="text/html"/>
107         </Submodule>
108         <Submodule>
109           <TitleBar title="Event Description"/>
110           <File displayFileInfo="no"
111  fileName="$SIP_HOME_DIRconf/share/events/descript
112  ionA" stripHtmlHeader="no" type="text/html"/>
113         </Submodule>
114         <Submodule>
115           <TitleBar title="Event Instructions"/>
116           <File displayFileInfo="no"
117  fileName="$SIP_HOME_DIRconf/share/events/instructi
118  onsA"stripHtmlHeader="no" type="text/html"/>
119         </Submodule>
120       </Generic>
121     </ModuleInstance>
122     <ModuleInstance
123  classid="com.hp.ov.portal.modules.ovgeneric"
124  display="yes" id="Trouble2" rollupState="down"
125  title="Tools">
126       <Generic>
127         <Submodule>
128           <TitleBar title="Ping"/>
129           <File displayFileInfo="no"
130  fileName="$SIP_HOME_DIRconf/share/events/ping"
131  stripHtmlHeader="no" type="text/plain"/>
132         </Submodule>
133         <Submodule>
134           <TitleBar title="Traceroute"/>
135           <File displayFileInfo="no"
136  fileName="$SIP_HOME_DIRconf/share/events/tracerou
137  te" stripHtmlHeader="no" type="text/plain"/>
```

TS MODULE REF
1206F (CONT)

TS MODULE REF
1206G

FIG. 12E

TS PROFILE
1200

```
138        </Submodule>                                         TS MODULE REF
139       </Generic>                                            1206G (CONT)
140      </ModuleInstance>
141      </ModuleInstance                                       TS MODULE REF
142  classid="com.hp.ov.portal.modules.alarms"                  1206H
143  display="yes"
144  help="/OvSipDocs/C/help/nmAlarms/alarmsView.html"
145  id="module23" rollupState="down" title="Recent
146  Alarms">
147        <AlarmDisplay>
148          <CategoryDefName href="mailserver6.xml"/>
149        </AlarmDisplay>
150      </ModuleInstance>
151      <ModuleInstance
152  classid="com.hp.ov.portal.modules.topomap"
153  display="yes"
154  help="/OvSipDocs/C/help/NMN/mapsView.html"                 TS MODULE REF
155  id="module10" rollupState="down" title="Topology">         1206I
156        <TopologyMap drillDown="no"
157  showStatus="yes">
158          <Submap
159  href="ovw://islandia.cnd.hp.com/default/15.2.112.Segm
160  ent3"/>
161          <Submap object="mailserver6.xml">
162        </TopologyMap>
163      </ModuleInstance>
164      <ModuleInstance
165  classid="com.hp.ov.portal.modules.ovgeneric"               TS MODULE REF
166  display="yes"id="Trouble3" rollupState="down"              1206J
167  title="ServiceDesk">
168        <Generic>
169          <Submodule>
170            <TitleBar title="Trouble Ticket"/>
```

FIG. 15A

TS PROFILE
1500

```
1   <?xml version="1.0" encoding="UTF-8"?>
2   <!DOCTYPE PortalView SYSTEM "PortalView.dtd">
3   <PortalView
4   colorScheme="/OvSipDocs/styles/default.css"
5   defaultSheetID="Troubleshoot" refreshRate="3600"
6   showDateTime="yes" showUserName="yes"
7   userName="Any User">
8
9     <Sheet id="Troubleshoot" title="Troubleshoot">
10      <Column width="narrow">
11        <ModuleInstance
12   classid="com.hp.ov.portal.modules.service.SvcCardServ
13   let" display="yes"
14   help="/OvSipDocs/C/help/SvcCard/cardView.htm"
15   id="my6" rollupState="down" title="Impacted
16   Services">
17          <ServiceCard details="no" server="bacchusn">
18            <ServiceRef name="email"/>
19          </ServiceCard>
20        </ModuleInstance>
21        <ModuleInstance
22   classid="com.hp.ov.portal.modules.ovgeneric"
23   display="yes"
24   help="/OvSipDocs/C/help/examples/integ.html"
25   id="Generic100" rollupState="down" title="Impacted
26   Customers">
27          <Generic>
28            <Submodule>
29              <TitleBar title="Gold Customers"/>
30              <EmbeddedHtml
31   data="<strong>VIC2</strong>"/>
32            </Submodule>
33          </Generic>
34        </ModuleInstance>
```

FIG. 15B

TS PROFILE
1500

```
35      <ModuleInstance
36   classid="com.hp.ov.portal.modules.vpis" display="yes"
37   help="/OvSipDocs/C/help/VPIS/VPISView.html"
38   id="module9" rollupState="down" title="Internet
39   Services">
40         <VPIS days="30" hours="1">
41           <ServiceType availability="no"
42   availabilityReport="no" id="module90" name="HTTP -
43   Web Pages" responseTime="yes"
44   responseTimeComponents="no"
45   serviceLevelViolations="yes"
46   serviceLevelViolationsReport="no"/>
47         </VPIS>
48      </ModuleInstance>
49      <ModuleInstance
50   classid="com.hp.ov.portal.modules.health"
51   display="yes"
52   help="/OvSipDocs/C/help/nmHealth/healthView.html"
53   id="module25" rollupState="down" title="Network
54   Health">
55         <NetworkHealth showRawData="no"
56   showUnknown="no">
57           <Summary display="yes" displayDepth="3"
58   id="Summary6" title="webserver4.acme.com Health">
59             <Component href="#IfHealth" vital="no"
60   weight="1"/>
61             <Component href="#CiscoCpuUtil"
62   vital="no" weight="1"/>
63             <NodeSelection id="Routers" op="AND"
64   title="Routers">
65               <IPHostFilter op="OR">
66                 <IPHost
67   hostname="coleman.cnd.hp.com"/>
68               </IPHostFilter>
69             </NodeSelection>
```

FIG. 15C

TS PROFILE
1500

```
70      </Summary>
71     </NetworkHealth>
72    </ModuleInstance>
73    <ModuleInstance
74  classid="com.hp.ov.portal.modules.bookmarks"
75  display="yes"
76  help="/OvSipDocs/C/help/bookMark/bookmkView.html
77  "id="my1450" rollupState="down" title="Reports">
78      <Bookmarks>
79        <Entry
80  href="http://sushi.bbn.hp.com/OvSipDocs/C/reports/ito_
81  service_history_yesterday/default.htm"
82  target="bookmarkwin" title="Services"/>
83        <Entry
84  href="http://sushi.bbn.hp.com/OvSipDocs/C/reports/ito_
85  service_severities/default.htm" target="bookmarkwin"
86  title="Availability"/>
87        <Entry
88  href="http://sushi.bbn.hp.com/OvSipDocs/C/reports/ito_
89  service_history_yesterday_horizontal/default.htm"
90  target="bookmarkwin" title="Performance"/>
91      </Bookmarks>
92    </ModuleInstance>
93   </Column>
94   <Column width="wide">
95    <ModuleInstance
96  classid="com.hp.ov.portal.modules.ovgeneric"
97  display="yes" id="Trouble1" rollupState="down"
98  title="Event Information">
99      <Generic>
100       <Submodule>
101         <TitleBar title="Event Details"/>
102         <File displayFileInfo="no"
103  fileName="$SIP_HOME_DIRconf/share/events/detailsB
104  "stripHtmlHeader="no"type="text/html"/>
```

FIG. 15D

TS PROFILE
1500

```
105         </Submodule>
106         <Submodule>
107           <TitleBar title="Event Description"/>
108           <File displayFileInfo="no"
109  fileName="$SIP_HOME_DIRconf/share/events/descript
110  ionB"stripHtmlHeader="no"type="text/html"/>
111         </Submodule>
112         <Submodule>
113           <TitleBar title="Event Instructions"/>
114           <File displayFileInfo="no"
115  fileName="$SIP_HOME_DIRconf/share/events/instruci
116  onsB"stripHtmlHeader="no"type="text/html"/>
117         </Submodule>
118       </Generic>
119     </ModuleInstance>
120     <ModuleInstance
121  classid="com.hp.ov.portal.modules.ovgeneric"
122  display="yes" id="Trouble2" rollupState="down"
123  title="Tools">
124       <Generic>
125         <Submodule>
126           <TitleBar title="Ping"/>
127           <File displayFileInfo="no"
128  fileName="$SIP_HOME_DIRconf/share/events/pingB"
129  stripHtmlHeader="no"type="text/plain"/>
130         </Submodule>
131         <Submodule>
132           <TitleBar title="Traceroute"/>
133           <File displayFileInfo="no"
134  fileName="$SIP_HOME_DIRconf/share/events/tracerou
135  teB"stripHtmlHeader="no"type="text/plain"/>
136         </Submodule>
137       </Generic>
138     </ModuleInstance>
```

FIG. 15E

TS PROFILE
1500

```
139        <ModuleInstance
140     classid="com.hp.ov.portal.modules.vpis" display="yes"
141     help="/OvSipDocs/C/help/VPIS/VPISView.html"
142     id="module10" rollupState="down" title="Internet
143     Services">
144            <VPIS days="30" hours="1">
145              <ServiceType availability="no"
146     availabilityReport="yes" id="module100" name="HTTP
147     - Web Pages" responseTime="no"
148     responseTimeComponents="yes"
149     serviceLevelViolations="no"
150     serviceLevelViolationsReport="yes"/>
151            </VPIS>
152         </ModuleInstance>
153         <ModuleInstance
154     classid="com.hp.ov.portal.modules.alarms"
155     display="yes"
156     help="/OvSipDocs/C/help/nmAlarms/alarmsView.html"
157     id="module23" rollupState="down" title="Recent
158     Alarms">
159            <AlarmDisplay>
160              <CategoryDefName href="webserver4.xml"/>
161            </AlarmDisplay>
162         </ModuleInstance>
163         <ModuleInstance
164     classid="com.hp.ov.portal.modules.ovgeneric"
165     display="yes" id="Trouble3" rollupState="down"
166     title="Service Desk">
167            <Generic>
168              <Submodule>
169                <TitleBar title="Trouble Ticket"/>
170                <file displayFileInfo="no"
171     fileName="$SIP_HOME_DIRconf/share/events/ticketB"
172     stripHtmlHeader="no"type="text/html"/>
173              </Submodule>
```

FIG. 15F

TS PROFILE
1500

```
174       <Submodule>
175         <TitleBar title="Trouble Ticket"/>
176         <File displayFileInfo="no"
177   fileName="$SID_HOME_DIRconf/share/events/ticketC"
178   stripHtmlHeader="no"type="text/html"/>
179       </Submodule>
180      </Generic>
181     </ModuleInstance>
182    </Column>
183   </Sheet></PortalView>
```

DYNAMIC GENERATION OF CONTEXT-SENSITIVE DATA AND INSTRUCTIONS FOR TROUBLESHOOTING PROBLEM EVENTS IN A COMPUTING ENVIRONMENT

RELATED APPLICATIONS

The following commonly owned applications may related to this application and are incorporated by reference herein below and elsewhere in this application:

U.S. patent application Ser. No. 09/845,427 entitled "A PORTAL SYSTEM AND METHOD FOR MANAGING RESOURCES IN A NETWORKED COMPUTING ENVIRONMENT", filed on Apr. 30, 2001.

U.S. patent application Ser. No. 09/845,430 entitled "SYSTEM AND METHOD FOR MANAGING DATA MINER MODULES IN AN INFORMATION NETWORK SYSTEM", filed on Apr. 30, 2001.

U.S. patent application Ser. No. 09/843,760 entitled "SYSTEM FOR DYNAMIC CUSTOMER FILTERING OF MANAGEMENT INFORMATION PRESENTED THROUGH A WEB-BASED PORTAL", filed on Apr. 30, 2001.

U.S. patent application Ser. No. 09/843,887 entitled "SYSTEM FOR DISPLAYING TOPOLOGY MAP INFORMATION THROUGH THE WEB", filed on Apr. 30, 2001.

U.S. patent application Ser. No. 09/764,563 entitled "METHOD AND APPARATUS FOR CUSTOMIZABLY CALCULATING AND DISPLAYING HEALTH OF A COMPUTER NETWORK", filed on Jan. 17, 2001.

U.S. patent application Ser. No. 09/843,888 entitled "SYSTEM FOR SECURE ACCESS TO INFORMATION PROVIDED BY A WEB APPLICATION", filed on Apr. 30, 2001.

BACKGROUND OF THE INVENTION

1. Field of the Invention

The present invention is directed to computer network systems and, more particularly, to troubleshooting network systems.

2. Related Art

Computer networks are widely used to provide increased computing power to facilitate the sharing of resources and to enable communication to occur between disperse users. Today's computer networks are large complex systems with many components from a large variety of vendors interconnected to form the network. Networks may include a number of computer devices within a room, a building or a site that are interconnected by a high speed local data link such as local area network (LAN), token ring, Ethernet or the like. Local networks in different locations may be interconnected by techniques such as packet switching, microwave links and satellite links to form a world-wide network such as the Internet. A network system can include several hundred or more interconnected devices.

Network management is the common term given to the task of planning, engineering, securing and operating a network system. One network management task is the troubleshooting of faults, errors and the like (collectively, "problem events") that occur in entities forming or operating on a network system. There are many different entities that need to be managed in a network. These entities include, for example, routers, bridges, PC's, workstations, minicomputers, supercomputers, printers, file servers, switches, communications systems, databases, software applications and the like. Such hardware and software entities are referred to herein simply as "entities" for ease of reference. As the types of entities that form or reside on a network system increase, so to does the variety of faults that must be diagnosed and remedied to maintain such entities operational. The task of troubleshooting a network system, therefore, requires greater expertise and becomes more difficult as the network system becomes larger and more complex.

Network management systems have been utilized in the past to assist a network administrator/network operator/customer/user/network manager ("network administrator" herein) troubleshoot the network system. As used herein, the term "troubleshoot" refers to the diagnostic activities performed to determine one or more correction actions necessary or potentially helpful to repair the cause or causes of a problem event. Typically, there is a management system for different types of entities on the network system. For example, large networks often include network managers, database managers and software application managers, to name a few. Due to the diversity of such managed entities, such management systems are commonly referred to as domain managers. Conventional network management systems typically operated by remote access, monitoring information from the managed entities on the network system. As the problem events occur, conventional network management systems notify the network administrator of the problem events for diagnoses and repair of the cause(s) of the problem event.

Unfortunately, conventional network management systems collect large volumes of information that must be evaluated by the network administrator to diagnose a problem. Oftentimes the information presented is not relevant to the diagnosis or correction of the problem. Conventional network management systems, therefore, place a tremendous burden on the network administrator. The network administrator must know or determine which information is relevant to the particular problem, and must also know or determine the source or sources of such diagnostic information as well as the manner in which the diagnostic information is to be retrieved from such source or sources.

In addition, the network administrator must be well versed in a wide variety of types of entities such as network systems, software applications, and the like in order to understand and respond to problems generated by the various entities on the network system. Oftentimes, the less proficient network administrator is misled by the presentation of less relevant information. This increases the likelihood that the network administrator will take a longer time to diagnose a problem or incorrectly diagnose the problem due to the inclusion of such irrelevant information in the evaluation of the problem event.

What is needed, therefore, is a system, method or technique to assist a network administrator troubleshoot a network system.

SUMMARY OF THE INVENTION

The present invention is directed to systems and methodologies for dynamically providing information to a network administrator that is relevant to a particular problem event. This information includes contextual instructions and diagnostic data that will assist the network administrator in the analysis of the problem event. Generally, the invention automatically obtains from relevant computing environment entities pertinent information likely to be necessary to troubleshoot the particular problem event. The context-sensitive information is presented dynamically on a display for consideration and interaction by the network administrator. Specifically, aspects of the invention include a database of executable troubleshooting (TS) profiles each specifically designed for a particular type of problem event. Each such TS profile references one or more troubleshooting data miner modules included in a library of such modules that accesses particular hardware and/or software entities in the computing environment for information. When a TS profile is invoked to assist a network administrator troubleshoot a particular type of problem event, the referenced data miner modules are executed and generate or cause the generation of troubleshooting instructions and diagnostic data which are then displayed to the network administrator.

Advantageously, this context-sensitive diagnostic data and troubleshooting instructions serve to guide the network administrator through the troubleshooting process for the particular problem event, facilitating the efficient identification and correction of the cause of the problem event. This is particularly beneficial in those environments in which inexperienced network administrators are responsible for troubleshooting events.

Another advantage of the present invention is that the TS profiles serve as a knowledge base of troubleshooting information and techniques, systematizing the knowledge of experts through the development and ongoing modification of such troubleshooting profiles. As new or refined approaches to addressing a particular problem event are developed, the corresponding TS profile can be modified to reference different or additional data miner modules to generate or cause the generation of different or additional diagnostic data or troubleshooting instructions reflecting the new or refined approach. This provides effective and efficient solutions for detecting, isolating and repairing problem events, even by less skilled personnel.

The invention is also flexible and extendable. It allows for the development of TS profiles to address a single problem event or a group of problem events having a common characteristic determined by the developer of the TS profiles. As new entities are added to the computing environment a corresponding troubleshooting data miner module can be added to obtain information therefrom. The invention, therefore, allows not only for the improved diagnosis of existing problem events occurring in existing entities, it also allows for new entities, technologies, applications and protocols.

In addition, automatically providing the network administrator with troubleshooting data from various entities across the computing environment eliminates the need for the network administrator to know or determine which information is relevant to the particular problem event. This also relieves the network administrator from knowing or determining the source or sources of such information and the manner in which the information is to be retrieved from such source entity or entities. This is a significant benefit because not all network administrators are knowledgeable about each of the different types of network entities and management systems. Providing the network administrator only with information helpful to isolate and correct the cause of a problem event while eliminating from display other, less relevant information prevents the network administrator from spending time obtaining and reviewing information that is unnecessary to be considered in the troubleshooting process. This also reduces the likelihood that the network administrator will incorrectly diagnose the problem event due to the inclusion of such irrelevant information in the troubleshooting process.

A number of aspects of the invention are summarized below, along with different embodiments of each of the summarized aspects. It should be understood that the embodiments are not necessarily inclusive or exclusive of each other and may be combined in any manner that is non-conflicting and otherwise possible, whether they be presented in association with a same or different aspect of the invention. It should also be understood that these summarized aspects of the invention are exemplary only and are considered to be non-limiting.

In one aspect of the invention, a troubleshooting mentor system is disclosed. The troubleshooting mentor system automatically provides a network administrator of a computing environment with diagnostic data and troubleshooting instructions to troubleshoot a selected problem event occurring in the computing environment. Importantly, the diagnostic data and instructions are specifically designed to provide the information and techniques necessary to enable a network administrator troubleshoot the selected problem event. The diagnostic data is automatically retrieved from relevant computing environment entities upon selection of the problem event, which is one of a plurality of problem events generated by domain managers in the computing environment. Each domain manager manages one or more entities on the computing environment.

In one embodiment, the troubleshooting mentor system includes a problem event processor, a troubleshooting profile manager and a troubleshooting portal view manager. Problem events are categorized according to the type of troubleshooting activity that is to be performed to diagnose the problem event. The problem event processor causes a display of the problem events that have occurred, and determines which troubleshooting type corresponds with the selected problem event. The troubleshooting profile manager executes a predetermined troubleshooting profile associated with that troubleshooting type. The troubleshooting portal view manager executes the retrieved troubleshooting profile and troubleshooting data miner modules referenced therein. Each troubleshooting data miner module generates or causes the generation of the diagnostic data and instructions which are subsequently displayed for the network administrator.

In another aspect of the invention, an apparatus that displays context-sensitive troubleshooting information relevant to the diagnosis of a particular problem event occurring a computing environment is disclosed. The troubleshooting information includes instructions for troubleshooting the particular problem event. The context-sensitive troubleshooting information is generated automatically and without network administrator action subsequent to identifying the particular problem event. Preferably, the context-sensitive troubleshooting information relevant to the particular problem event includes diagnostic data for assisting a network administrator in the diagnosis of the particular problem event.

In one embodiment, the apparatus includes a database of troubleshooting data miner modules each generating or causing the generation of either troubleshooting instructions or diagnostic data. Also included is a repository of troubleshooting profiles each referencing one or more data miner modules that result in the generation of troubleshooting instructions and diagnostic data for a particular type of problem event. A memory device that stores data that associates each problem event type with a troubleshooting profile is also included. A troubleshooting software module displays problem events received from domain managers and determines the type of problem event selected by an administrator. The software module also retrieves from the repository a troubleshooting profile that is associated with the determined type, and executes the retrieved troubleshooting profile. This causes the invocation of the referenced troubleshooting data miner modules and the display of the diagnostic data and troubleshooting instructions generated by the referenced troubleshooting data miner modules.

In a still further aspect, a method for displaying context-sensitive information relevant to a particular problem event occurring in an entity of a computing environment is disclosed. The method includes A) receiving a selected problem event; B) generating contextual instructions and diagnostic data pertinent to troubleshooting the particular problem event; and C) displaying the instructions and diagnostic data on a display device.

In one embodiment, receiving a selected problem event comprises: 1) receiving a plurality of problem events each generated by a domain manager residing in the computing environment; and 2) storing the received problem events in a repository of problem events that have occurred in the computing environment. The method also includes 3) displaying the plurality of stored problem events in an interactive display; 4) receiving a network administrator selection of one of the displayed problem events; and 5) generating an output indicating which of the plurality of problem events is the selected problem event.

In another embodiment, generating contextual diagnostic data pertinent to troubleshooting the particular problem event includes 1) determining which type of problem event is the selected problem event; and 2) determining which troubleshooting diagnostic data and instructions to display based on the type of the selected problem event. This latter operation includes a) providing a database of troubleshooting data miner modules each generating or causing the generation of diagnostic data and/or instructions related to a particular network entity or function. A second operation of b) generating a database of troubleshooting profiles each referencing a predetermined one or more troubleshooting data miner modules to display diagnostic data and troubleshooting instructions pertinent to a particular type of problem event is also included. This operation further includes c) retrieving from the database of troubleshooting profiles a troubleshooting profile associated with the type of the selected problem event; and d) invoking the retrieved troubleshooting profile and the one or more troubleshooting data miner modules referenced therein.

In a still further aspect of the invention, a method for displaying context-sensitive information relevant to a particular problem event occurring in an entity of a computing environment is disclosed. The method includes A) displaying a representation of a plurality of problem events that have occurred in computing environment; B) receiving an network administrator selection of one of the displayed problem event representations; and C) displaying, in response to the network administrator selection, diagnostic data pertinent to troubleshooting the selected problem event and instructions informing the network administrator how to troubleshoot the selected problem event. In a particular embodiment, the method also includes D) displaying graphical display elements representing additional, more detailed information; E) receiving an network administrator graphical selection of once such graphical display element; and F) displaying the additional, more detailed information represented by the selected display element in response to the network administrator graphical selection.

In another aspect of the invention, a computer program product comprising a computer readable medium having computer program logic recorded thereon for enabling a processor in a computer system to automatically display diagnostic data and instructions on how to troubleshoot a selected problem event is disclosed. The diagnostic data and instructions are specifically relevant to troubleshooting the selected problem event.

In a further aspect of the invention, a program storage device readable by a machine, tangibly embodying a program of instructions executable by the machine to perform method steps for displaying context-sensitive information relevant to a particular problem event occurring in an entity of a computing environment is disclosed. The method includes A) receiving a selected problem event; B) generating contextual instructions and diagnostic data pertinent to troubleshooting the particular problem event; and C) displaying the instructions and the diagnostic data on a display device.

Various embodiments of the present invention provide certain advantages and overcome certain drawbacks of the conventional techniques. Not all embodiments of the invention share the same advantages and those that do may not share them under all circumstances. Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

The present invention is pointed out with particularity in the appended claims. The above and further advantages of this invention may be better understood by referring to the following description taken in conjunction with the accompanying drawings, in which:

FIG. 7 is a high-level flow chart of the operations performed by troubleshooting mentor in accordance with one embodiment of the present invention.

FIG. 8 is a more detailed flow chart of the processes performed by troubleshooting mentor in accordance with one embodiment of the present invention.

FIG. 9 is a more detailed flow chart of the processes performed by troubleshooting mentor in accordance with one embodiment of the present invention.

FIGS. 12A–12F together illustrate another example of a TS profile of the present invention.

FIGS. 15A–15F together illustrate another example of a TS profile of the present invention.

DETAILED DESCRIPTION

I. Introduction

A. High-Level Description

Figure 1:
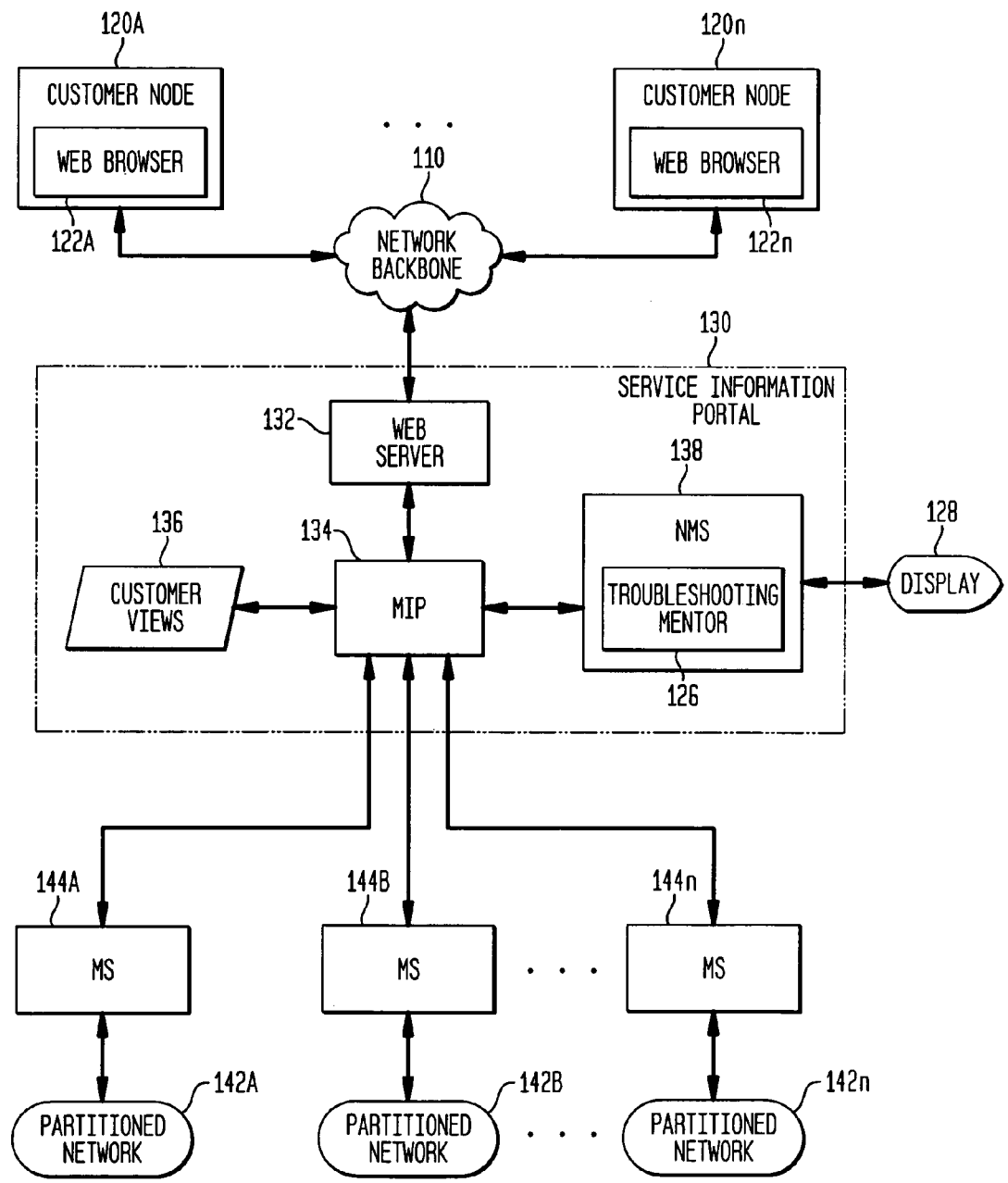
FIG. 1 is a block diagram of an exemplary network suitable for implementing the troubleshooting system of the present invention.

The present invention is directed to systems and methodologies for dynamically providing information to a network administrator that is relevant to a particular problem event. This information includes contextual instructions and diagnostic data that will assist the network administrator in the analysis of the problem event. Generally, the invention automatically obtains from relevant network system entities pertinent information likely to be necessary to troubleshoot the particular problem event. The context-sensitive information is presented dynamically on a display for consideration and interaction by the network administrator. Specifically, aspects of the invention include a database of executable troubleshooting (TS) profiles each specifically designed for a particular type of problem event. Each such TS profile references one or more troubleshooting data miner modules included in a library of such modules that accesses particular hardware and/or software entities in the network system for particular information. When a TS profile is invoked to assist a network administrator troubleshoot a particular type of problem event, the referenced data miner modules are executed and generate or cause the generation of troubleshooting instructions and diagnostic data which are then displayed to the network administrator.

Advantageously, this context-sensitive diagnostic data and troubleshooting instructions serve to guide the network administrator through the troubleshooting process for the particular problem event, facilitating the efficient identification and correction of the cause of the problem event. This is particularly beneficial in those environments in which inexperienced network administrators are responsible for troubleshooting events.

Another advantage of the present invention is that the TS profiles serve as a knowledge base of troubleshooting information and techniques, systematizing the knowledge of experts through the development and ongoing modification of such troubleshooting profiles. As new or refined approaches to addressing a particular problem event are developed, the corresponding TS profile can be modified to reference different or additional data miner modules to generate or cause the generation of different or additional diagnostic data or troubleshooting instructions reflecting the new or refined approach. This provides effective and efficient solutions for detecting, isolating and repairing problem events, even by less skilled personnel.

The invention is also flexible and extendable. It allows for the development of TS profiles to address a single problem event or a group of problem events having a common characteristic determined by the developer of the TS profiles. As new entities are added to the network system a corresponding troubleshooting data miner module can be added to obtain information therefrom. The invention, therefore, allows not only for the improved diagnosis of existing problem events occurring in existing entities, it also allows for new entities, technologies, applications and protocols.

In addition, automatically providing the network administrator with troubleshooting data from various entities across the network system eliminates the need for the network administrator to know or determine which information is relevant to the particular problem event. This also relieves the network administrator from knowing or determining the source or sources of such information and the manner in which the information is to be retrieved from such source entity or entities. This is a significant benefit because not all network administrators are knowledgeable about each of the different types of network entities and management systems. Providing the network administrator only with information helpful to isolate and correct the cause of a problem event while eliminating from display other, less relevant information prevents the network administrator from spending time obtaining and reviewing information that is unnecessary to be considered in the troubleshooting process. This also reduces the likelihood that the network administrator will incorrectly diagnose the problem event due to the inclusion of such irrelevant information in the troubleshooting process.

B. Exemplary Network Application

For simplicity and illustrative purposes, the principles of the present invention are described with reference to an exemplary network application of a service information portal. However, one of ordinary skill in the art would readily recognize from the present disclosure that the present invention can be implemented in any network node in any network environment, and is applicable to all types of network management systems.

As used herein, the term "computing environment" refers to virtually any local or distributed system, processing platform or structure. One common computing environment in which troubleshooting operations are performed is a network system. FIG. 1 is a block diagram of an exemplary network system 100 in which the troubleshooting mentor of the present invention is implemented. Network 100 includes individual computing platforms generally referred to as network nodes. Network nodes include but are not limited to workstations, personal computers, thin clients, file servers, computer servers and host computers. In general, network elements are anything that participates in the service of providing for the generation and transfer of data and resources in network system 100. Network elements include, for example, LANs, routers, bridges, gateways, multiplexers, switches, connectors and the like. These network devices are considered to be well-known in the art and are not described further herein.

Network system 100 includes a backbone 110 formed of numerous network devices to which is connected customer nodes 120 and a service information portal (SIP) 130. Network system 100 may be implemented as a local area network, wide area network, wireless network, the Internet or the like. In this exemplary embodiment, network system 100 utilizes a hypertext transfer protocol (HTTP) to provide communication services between web browsers 122 residing on customer nodes 120 and a web server 132 on service information portal 130. Web browsers 122 can be, for example, the NAVIGATOR from the Netscape Communications Corporation of Mountain View, Calif., USA, or the INTERNET EXPLORER from the Microsoft Corporation of Redmond, Wash., USA, among others. It should be understood that any one of a variety of other network protocols such as TCP/IP, X.25, and others can also be used to provide such communication services.

A service information portal 130 managed by a service provider provides a variety of network services to customers 120. The network services may include Internet services, electronic mail (e-mail) services, data storage, network management services and the like. A customer may not prefer to create and/or manage a network to provide network services. Oftentimes, such decisions are driven by a lack of expertise, cost, etc. In order to receive network services, a customer may utilize a service provider to provide for the desired network services. The service provider configures a portion of network 100 into partitioned networks 142 and allocates each partitioned network to a particular customer 120.

A management information portal 134 may be configured to provide customized management services to customers 120 by referencing a customer views module 136. The customer views module 136 may be configured to maintain a database of the types of services available to each customer in response to being authenticated by the service information portal 130. The management information portal 134 may be further configured to interface with a network management system ("NMS") 138. NMS 138 may be configured to provide network management services such as network configuration and control, monitoring, evaluation and maintenance, and the like, to the management information portal 134 for network 110. In accordance with aspects of the present invention, network management system 138 includes a troubleshooting mentor 126 of the present invention.

Service information portal 130 communicates with entities in network partitions 140 through a management station (MS) 144. Management stations 144 may be configured to provide a management node function for each of the partitioned networks 142. Existing network management protocols include Simple Network Management Protocol (SNMP), Internet Control Message Protocol (ICMP) and many proprietary network management protocols. Service information portal 130 communicates with management stations 144 using one of these or another protocol.

Troubleshooting mentor 126 is, as noted, included in network management node 118 in this illustrative application of the invention. Troubleshooting mentor 126 is a software tool that dynamically provides to the network administrator contextual instructions and diagnostic data that are relevant to troubleshooting a particular problem event. Troubleshooting mentor 126 automatically obtains from relevant network system entities pertinent information likely to be helpful to diagnose the cause of the particular problem event. The context-sensitive information is presented dynamically on a user interface 128 for consideration and interaction by the network administrator. The user interface 128 can include a video display screen keyboard, mouse, printer, etc., and provides all types of interactions with a network administrator. The user interface 128 controls the screen, keyboard, mouse and pointer and provides the user with a view of network system 100 that is being managed. User interface 128 receives information from the troubleshooting mentor 126 in accordance with the present invention as described below.

II. Troubleshooting Mentor 126

A. Introduction

Figure 2:
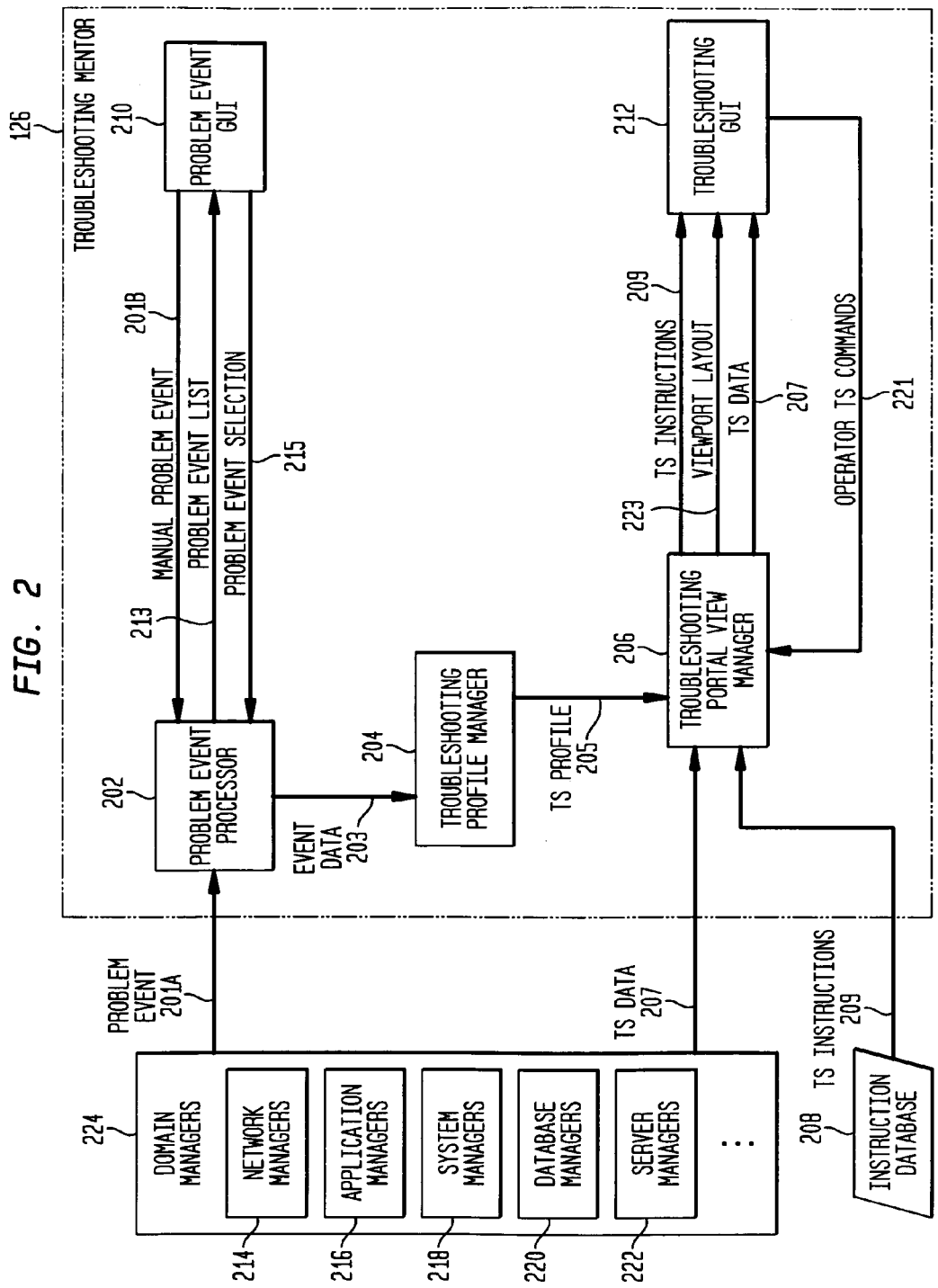
FIG. 2 is a schematic block diagram of the primary components of a troubleshooting mentor in accordance with one embodiment of the present invention.

FIG. 2 is a schematic block diagram of the primary components of a troubleshooting mentor 126 in accordance with one embodiment of the present invention. Troubleshooting mentor 126 is represented by the dashed box illustrated in FIG. 2, and includes a number of primary components shown located therein.

Network system 100 includes various management systems that generate problem events. Such management systems generally include historical and real-time data regarding the health of the managed network entity. Such management systems are accessed for troubleshooting information in accordance with aspects of the present invention. For example, network manager 214 are software products that manage individual networks as well as large collections of networks. An exemplary network manager is the Open View® Network Node Manager available from Hewlett-Packard Company, Palo Alto, Calif., USA. (OPENVIEW is a registered trademark of Hewlett-Packard Company.)

Application managers 216 are software products that manage the software applications executing on a particular node or server of network 100. Examples of commercially available application managers are the Patrol® available from BMC Software, Inc., Houston, Tex., USA. and the Open View® SPI, available from Hewlett-Packard Company, Palo Alto, Calif., USA. (PATROL is a registered trademark of BMC software, Inc.) System managers 218 can be any management tool that manages the infrastructure of the particular network or components of network system 100. Examples of system managers 218 include the Open View® VantagePoint™ available from Hewlett-Packard Company, Palo Alto, Calif., USA. (VantagePoint is a trademark of Hewlett-Packard Company.)

Database managers 220 are software products that manage large, complex databases that are accessible to many users across network system 100. Examples include any of the Portal® database manager products available from BMC Software, Inc. Server managers 222 are software products that assist a network administrator manage the operations of each server in a network. Examples include any of the Portal® server manager products available from BMC Software, Inc., and the Open View® VantagePoint Operations available from Hewlett-Packard Company.

As noted, these management systems are generally and collectively referred to herein as domain managers 224. The term "domain" reflects the variety of hardware and software that is being managed by each of the managers 214, 216, 218, 220 and 222. That is, for each aspect or "domain" of network system 100, there are one or more management systems configured to manage that particular aspect or domain of components, systems, devices, software, etc. It should be understood that this list of domain managers 224 is exemplary only, and that troubleshooting mentor 126 of the present invention can operate with other domain managers 224 now or later developed.

Domain managers 224 provide an indication of an occurrence that requires or may require the attention of the network administrator. Domain managers 224 typically include software and systems that monitor the operations of the managed objects. This monitoring software detects faults, errors and other conditions (as noted, "problem events") in the managed objects and generated a signal 201 indicating the nature and details of such an occurrence. As used herein, the term "problem event" also refers to the generation of any indication of the above or any other condition that warrants the attention of a network administrator. Thus, signal 201 is referred to herein as problem event signal 201 or, simply, problem event 201. In addition to the above and other automatically-generated indications, the term "problem event" also includes indications that are entered manually into troubleshooting mentor 126. For example, the network administrator may witness a problem or a customer of the network may call or email the network administrator with an indication of a problem condition. In response to such occurrences, the network administrator enters the event information into troubleshooting mentor 126 as described below. Such an entry is referred to herein as a problem event.

Problem event processor 202 receives problem events 201A as well as manual problem events 201B (collectively and generally referred to as problem events 201). Event processor 202 consolidates the received events 201, 211. That is, event processor 202 includes the functionality to interface with different domain managers 224, and interpret and store representations of problem events 201 in a memory device. This problem event list 213 is provided to a problem event graphical user interface (GUI) 210 for ultimate display to the network administrator. Thus, problem event processor 202 can provide the network administrator with a view of the problem events 201 that have occurred in network system 100. Examples of two such event list display windows are described below with reference to FIGS. 11 and 14.

The network administrator can graphically select which of the problem events 201 displayed in the event list display window to troubleshoot at any given time. The network administrator makes such a selection through problem event GUI 210, resulting in the generation of problem event selection 215. Event processor 202 selects and generates certain data 203 associated with selected event 215. Problem events 201 fall into a number of different types or categories. Event data 203 includes an indication of the type of problem event 201.

A troubleshooting profile manager 204 receives event data 203 generated by problem event processor 202. Event data 203 provides details about the selected problem event 215. Based on the type of problem event, profile manager 204 determines which of a plurality of troubleshooting (TS) profiles 205 is to be implemented to assist the network administrator diagnose and correct the cause or causes of the problem event. Each such TS profile 205 is associated with a particular type of problem event, and references troubleshooting data miner modules that accesses particular hardware or software entities in the network for information specific for troubleshooting the associated type of problem event.

A troubleshooting portal view manager 206 invokes the TS profile 205, retrieving TS data 207 from domain managers 224 and TS instructions 209 from an instruction database 208 that are referenced in the implemented TS profile 205. This event-type-specific information is displayed through troubleshooting GUI 212 in accordance with TS profile 205, along with any other information contained within TS profile 205. TS profile 205 is designed to provide information to enable the network administrator to address the specific type of problem event 215. Accordingly, the retrieved TS data 207 and TS instructions 209 are particularly relevant to troubleshooting the selected problem event 215. This information is provided to troubleshooting GUI 212 for display in accordance with viewpoint layout information 223 provided by portal view manager 206.

Should information other than that provided by portal view manager 206 be desired by the network administrator to troubleshoot selected problem event 215, the network administrator can enter a command 221 requesting that different TS data 207 be obtained. Troubleshooting portal view manager 206 accesses domain managers 224 as necessary to obtain or cause the generation of the requested TS data 207.

B. Detailed Description

Each of the introduced elements of troubleshooting mentor 126 will now be described. As described above and illustrated in FIG. 2, troubleshooting mentor 126 primarily includes problem event processor 202, troubleshooting profile manager 204, troubleshooting portal view manager 206 and the associated GUIs 210 and 212. Problem event processor 202 will be described with reference to FIG. 3, troubleshooting profile manager 204 will be described with referenced to FIGS. 4 and 5, and troubleshooting portal view manager 206 will be described with reference to FIG. 6. The graphical user interfaces 210 and 212 are conventional entities that display problem event list 213 or TS data and instructions 207, 209 in response to the other components of troubleshooting mentor 126. After the functions of each such component of troubleshooting mentor 126 is described, the flow of operations performed by troubleshooting mentor 126 will then be described with referenced to FIGS. 7–10.

1. Problem Event Processor 202

Figure 3:
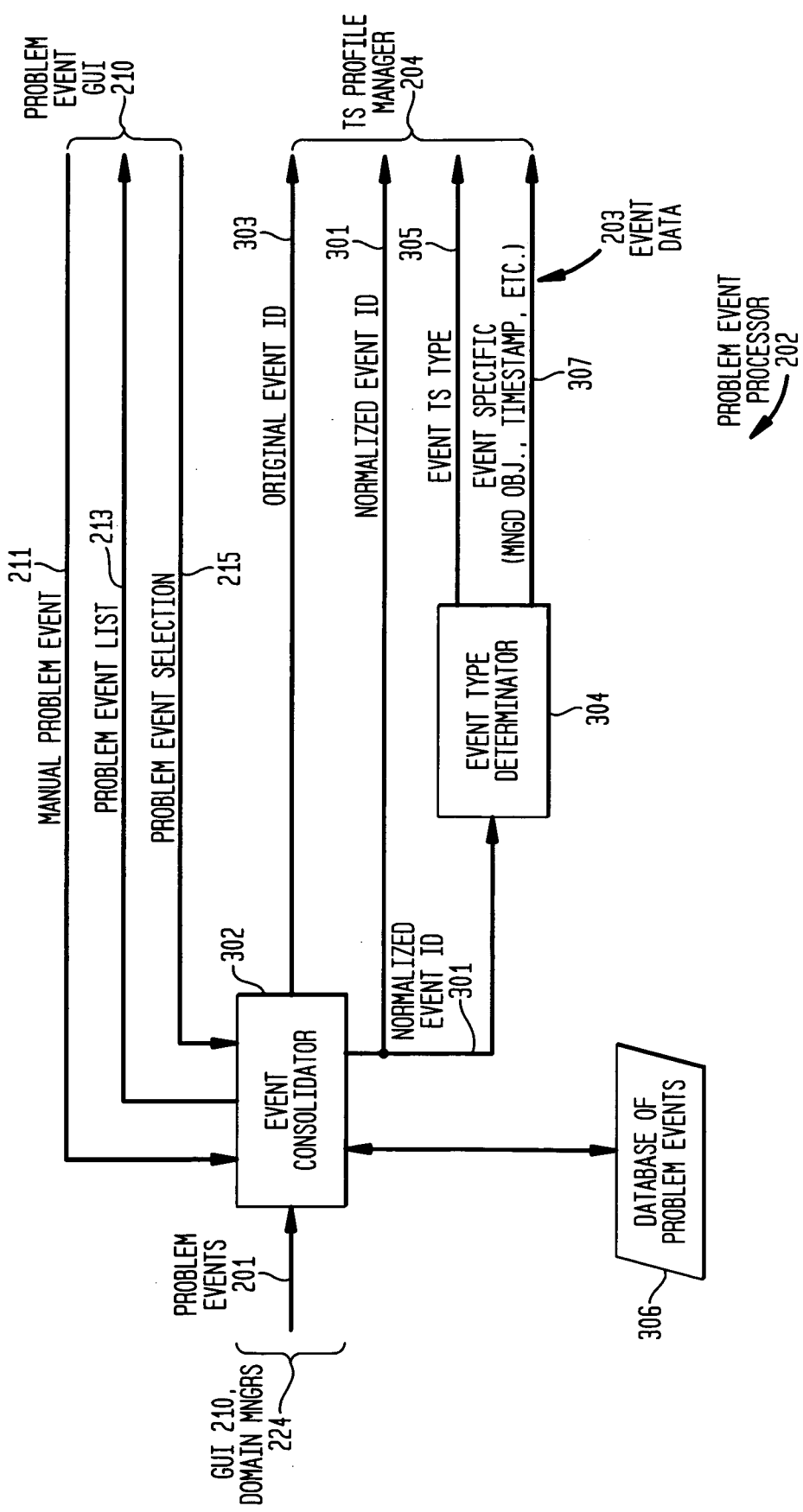
FIG. 3 is a functional block diagram of a problem event processor in accordance with one embodiment of the present invention.

Problem event processor 202, as noted, provides the network administrator with a view of problem events 201 which have occurred in network system 100, and provides event data 203 associated with a selected one of such problem events 215. FIG. 3 is a functional block diagram of problem event processor 202 in accordance with one embodiment of the present invention. Problem event processor 202 includes an event consolidator 302 and an event type determinator 304. Each of these components is described in detail below.

Generally, event consolidator 302 receives problem events 201 from domain managers 224. Problem events 201 that are generated by different domain managers 224 have different information, different formats and the like. Event consolidator 302 processes this wide variety of problem events 201 and generates a standard format event identifier, referred to herein as a normalized event identifier (ID) 301. This normalized event identifier 301 includes the same information as problem event 201 from which it is derived, but is in a format recognizable by the second primary component of event processor 202, event type determinator 304.

Event consolidator 302 displays a list 213 of problem events 213 through problem event GUI 210. The network administrator, upon viewing problem event list 213, selects one of the presented events for troubleshooting. Such a selection can be made through any graphical or user interface device. This selection is represented by problem event selection 215.

Event consolidator 302 not only generates normalized event ID 301, but also generates other information related to problem event 201. This other information is utilized by other components of troubleshooting mentor 126 other than event type determinator 304. This other information generated by event consolidator 302 includes the original event ID 303 for use by TS profile manager 204. Event consolidator 302 can be any well-known event consolidator now or later developed such as the Open View® Vantage Point Operations product available from Hewlett-Packard Company, and the Netcool event consolidator available from Micromuse. Event consolidator 302 is considered to be well known in the art and is not described further herein.

Event type determinator 304 receives normalized event identifier 301. In accordance with the disclosed embodiment, normalized event ID 301 is presented in a predetermined format and includes information such as a timestamp, source machine, description field, management system, for one example.

In accordance with aspects of the present invention, all problem events 201 are operationally categorized in accordance with the type of troubleshooting information and activities that may be required to be performed or analyzed in order to successfully troubleshoot selected problem event 215. Event type determinator 304 generates an event TS type 305 indicating the troubleshooting category that selected problem event 215 falls into.

In addition, event type determinator 304 generates event specifics 305. Event specifics 307 includes such information as the identification of the managed object, such as a network node identifier, software application instance identifier or the like. Event specifics 307 also includes location in network 100 at which the event occurred, and other information related to the occurrence of selected problem event 215.

In an alternative embodiment, event consolidator 302 generates a normalized event ID 301 that includes a field that identifies the type of problem event 201. In such embodiments, problem event processor 202 need not include a separate element that determines the event TS type such as event type determinator 304. Instead, TS profile manager 204, described next below, utilizes the event type provided directly by event consolidator 302 in such embodiments.

The event identification 301, original event ID 303, event specifics 307 and event TS type 305 are collectively referred to as event data 203. As noted, event data 203 is provided to TS profile manager 204, described next below.

2. TS Profile Manager 204

Figure 4:
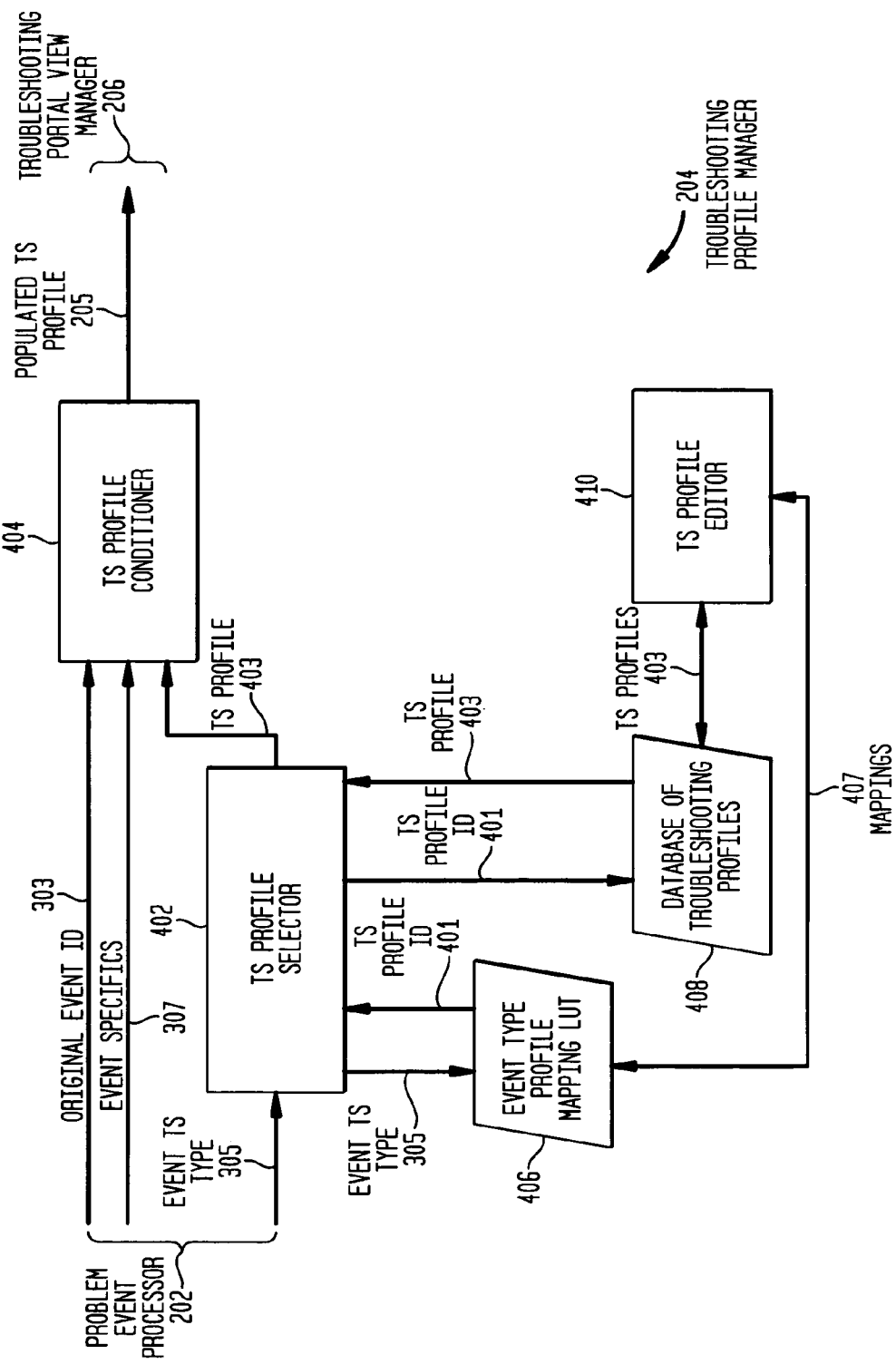
FIG. 4 is a functional block diagram of one embodiment of troubleshooting profile manager of the present invention.

FIG. 4 is a functional block diagram of one embodiment of troubleshooting profile manager 204 of the present invention. Included in troubleshooting profile manager 204 is a database 408 of troubleshooting profiles 403. As will be described in detail below, troubleshooting profiles 403 are generated and stored in database 408 a priori. A TS profile selector 402 receives event TS type 305 and selects one TS profile 403 appropriate for diagnosing the original selected event 215. TS profile 205 is an extensible, executable software program that invokes a predetermined combination of troubleshooting data miner modules (described below) that generate or cause the generation of context-sensitive troubleshooting data and instructions to assist the network administrator determine the cause or causes of selected problem event 215.

As noted with reference to problem event processor 202, event TS type 305 represents a type of event. There may be many such event types some of which can be supported by the same TS profile 403. The relationship between event TS type 305 and TS profile 403 could be unknown (new events can be generated as network system 100 expands or changes). In addition, the number of event TS types can be greater than the number of TS profiles 403. Because of such circumstances, TS profile selector 402 may be required, in certain embodiments, to perform some processing to map a TS profile 403 to an event type 305 of selected problem event 215.

As noted, the selection of which TS profile 403 is to be used to assist the network administrator in the diagnosis of problem event 215 is based on the context of the event. This context is provided by event TS type 305. In one embodiment disclosed in FIG. 4, TS profile selector 402 interfaces with a mapping look-up table (LUT) 406 that includes mappings between event TS type 304 and TS profile identifiers (IDs) 401. TS profile selector 402 accesses LUT 406 with event TS type 305 and retrieves an associated TS profile ID 401. This mapping LUT 406 provides troubleshooting profile manager 204 with the capability of changing, adding and otherwise editing the mappings as information about the troubleshooting process in learned.

The use of a LUT 406 to provide the mappings is advantageous in those environments in which the mappings may change over time since LUTs can be easily populated with new data. In addition, implementing such functionality in a LUT allows for efficient processing. For example, in one embodiment, wildcard matching is implemented to avoid having to enumerate each and every event TS type 305. In addition, an ID for a default TS profile can be included in mapping LUT 406 for those circumstances when there is no entry in mapping LUT 406 for the received event TS type 305. As one of ordinary skill in the art would find apparent, other functions and operations associated with the use of a LUT-based mapping scheme can be implemented in TS profile selector 402. Such modifications are considered to be within the scope of the present invention. Thus, upon receipt of event TS type 305, TS profile selector 402 accesses LUT 406 and retrieves TS profile 401. TS profile selector 401 then accesses database 408 and retrieves the identified TS profile 403.

As shown in FIG. 4, a TS profile editor 410 is also included in troubleshooting profile manager 204. TS profile editor 410 enables an network administrator to modify, add or delete the contents of mapping LUT 406 and TS profile database 408. Thus, as problem events 201 change, such as in response to the addition to domain managers 224, or as additional TS profiles 403 are generated, database 408 can be easily modified, and, if necessary, LUT 406 can be edited to reflect such changes in database 408.

Figure 5:
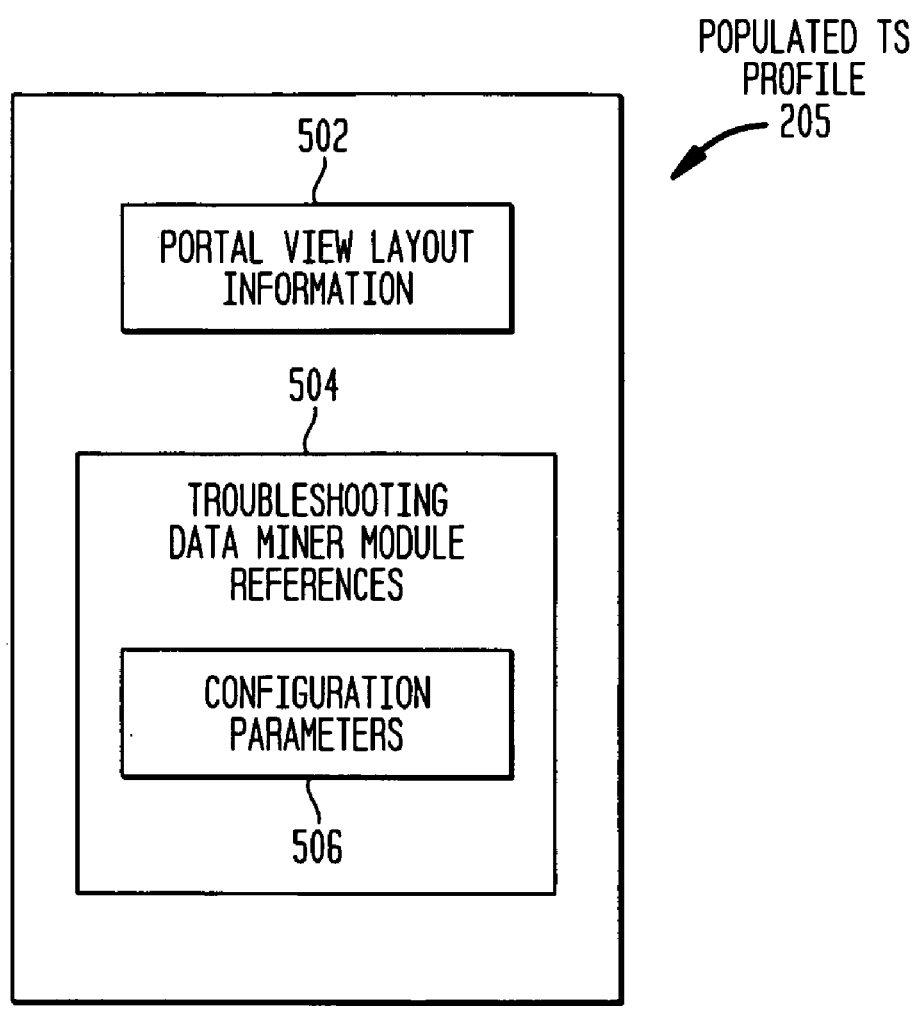
FIG. 5 is a block diagram illustrating the contents of a TS profile in accordance with one embodiment of the present invention.

A TS profile 403 is an executable, extensible file that, when invoked, obtains or generates instructions and data for correcting the particular event 201. FIG. 5 is a block diagram illustrating the contents of a TS profile 205. As will be described below, TS profile 403 retrieved from database 408 which is populated by a TS profile conditioner 404. FIG. 5 illustrates a populated TS profile 205.

TS profile 205 includes portal view layout information 502 for use by troubleshooting portal view manager 206 and troubleshooting GUI 212 in the generation of a TS view window (described below). Such a troubleshooting view window includes contextual instructions 209 and relevant troubleshooting data 207, introduced above. Instructions 209 and troubleshooting data 207 are obtained by troubleshooting data miner modules or, simply, data miners (also described below) invoked by TS profile 205. TS profile 205 includes references 504 to a predetermined combination of data miners that are to be utilized to obtain troubleshooting information relevant to the diagnosis of selected problem event 215. In addition, TS profile 205 also includes data miner configuration information 506. Such information is included in parameter values that provide requisite information such as the problem event, managed object and domain manager, specify the type and breadth of information requested, the manner in which information is to be analyzed, displayed, etc. Detailed examples of TS profile 205 are set forth below.

As noted, TS profile 403 is populated by TS profile conditioner 404. Original event ID 303 and one or more event specifics 307 are added to TS profile 403 depending on which TS profile 403 is retrieved and which data miners are referenced therein. The results of this conditioning is populated TS profile 205 which can be executed by portal view manager 206.

It should be noted that certain default configuration data 506 can be included in TS profile 403. Such default information is modifiable by the network administrator as described elsewhere herein.

3. TS Portal View Manager 206

Figure 6:
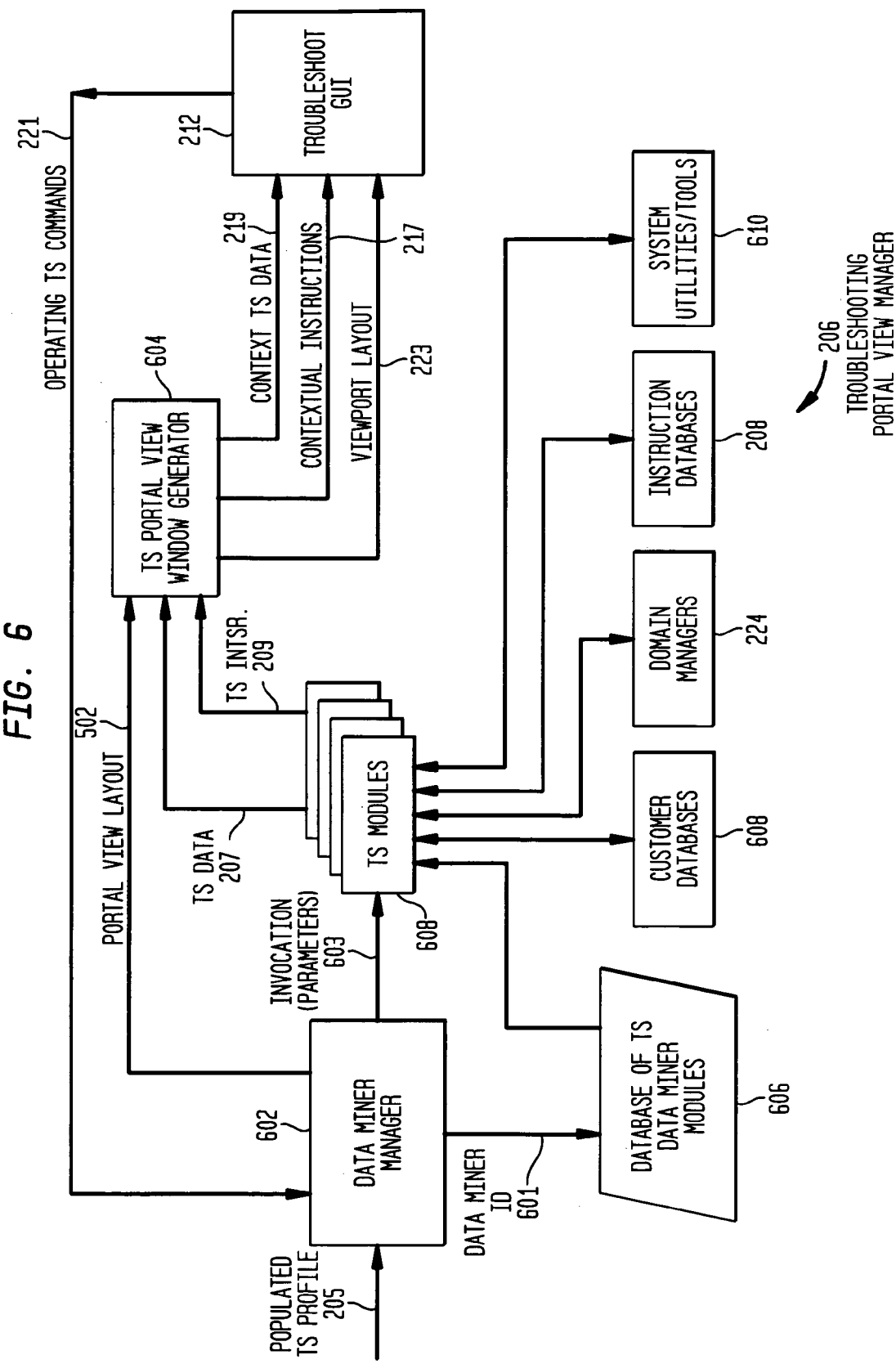
FIG. 6 is a functional block diagram of one embodiment of troubleshooting portal view manager of the present invention.

FIG. 6 is a functional block diagram of one embodiment of troubleshooting portal view manager 206 of the present invention. As noted, troubleshooting portal view manager 206 retrieves TS data 207 and instructions 209 and displays the retrieved information through troubleshooting GUI 212 in accordance with TS profile 205, along with any other information contained within TS profile 205. TS profile 205 is associated with the type of selected problem event 215. Accordingly, the retrieved data 207 and instructions 209 are particularly relevant to troubleshooting that event 215. Portal view manager 206 includes a database 606 of troubleshooting data miner modules 608 each of which obtains, generates or causes the generation of specific TS data 207 and/or TS instructions 209.

A data miner manager 602 manages database 606 of data miners, loading and invoking TS data miner modules 608 that are referenced in populated TS profile 205. As will be described below, TS data miner modules 608 are typically software programs that, when executed, access, call, query, or otherwise interface with external entities to retrieve or cause the generation of TS data 207 and TS instructions 209. A TS portal view window generator 604 causes troubleshooting GUI 212 to display TS data and instructions 207, 209 generated by TS data miner modules 608 in accordance with portal view layout information contained within populated TS profile 205. Each of these components is described in detail below.

TS data miner modules 608 obtain, generate or cause the generation of specific information. TS modules 608 are typically executable software modules. The term "data miner" as used herein refers to all types of software modules that gather or cause the generation of data related to the troubleshooting process. For example, TS data miner modules 608 include software modules that mine data from the database of one or more domain managers 224. In addition, TS data miner modules 608 can include software programs that access knowledge databases provided by a customer of network system 100 such as instruction database 208. Instruction database 208 includes, as noted, instructions generated by, for example, a customer to provide specific or detailed instructions regarding how to address particular problem events. In addition, TS data miner modules 608 refers to software programs that call or invoke system utilities and tools that, when executed, generate TS data 207. Thus, TS data miner modules 608, as used herein, refers to virtually any mechanism that results on the generation of TS data 207, whether directly, such as through the accessing of a database, or indirectly, such as through the generation of a command that causes another software program to generate TS data 207 or TS instructions 209.

To illustrate some exemplary external sources of TS data 207 and TS instructions 209, data miners 608 illustrated in FIG. 6 share an interface with four exemplary external sources. A primary source of TS data 207 are domain managers 224. Domain managers 224 maintain significant amounts of information pertaining to the entities they manage; that is, the managed objects. Not only is historical information available, but contemporaneous information can also be generated by certain domain managers 224 when requested to do so. Many domain managers 224 offer report generation functions which can be invoked by a data miner 608 to obtain, for example, the noted historical information. The type and scope of the information provided by domain managers 224 can generally be specified by the requesting entity.

Customer databases 608 are external sources of information provided by the customer or the customer's systems that contain information that is desirable to access during a troubleshooting process. For example, in one embodiment, customer databases 608 includes a data repository of troubleshooting information generated by troubleshooting tools not shown in the figures.

Instruction databases 208 are repositories of TS instructions 209. As noted, one of the significant benefits of the present invention is to provide the network administrator with contextual instructions that assist the network administrator through a troubleshooting process. These instructions can be as detailed as desired and can be targeted to network administrators having any level of expertise. As noted, network system 100 can include systems or devices that are unique to a particular customer. As one of ordinary skill in the art would find apparent, TS instructions 209 can be presented to the network administrator in virtually any form. For example, text, graphical elements, examples, etc., may be presented. Different levels of information, selectable by the network administrator, can be provided. HTTP links can be used to allow novice users drill down to more specific instructions that may not otherwise be useful to a more experienced network administrator. Links to video clips, manuals and the like can also be provided. Such TS instructions 209 can be included in TS profile 403. However, in certain embodiments, it is preferable that such TS instructions 209 be included in one or more accessible databases 208. In addition, data miners 608 can invoke system utilities and tools 610. Such utilities and tools include programs that generate diagnostic or status information, and can reside in any number of devices in network system 100. There are numerous TS data miner modules 608 that can be utilized or created to generate TS data 207 and TS instructions 209 in accordance with the present invention. A number of examples are set forth below.

When a problem event 201 occurs, there may be services that are adversely impacted by that occurrence. An impacted services TS data miner module 608 accesses databases in, for example, domain managers 224, that contain mappings of infrastructure devices to high-level business services. The services impacted by the problem event 201 can then be provided to the network administrator for diagnosis and for consideration in taking corrective or mitigating actions. For example, when a problem event 201 indicates that there is a low-level problem such as a server that has gone off line, impacted services TS data miner module 608 will show the network administrator which services are affected by the server going down. The result of this inquiry can reveal, for example, the e-mail service that resides on the failed server. Similarly, if a problem event 201 indicates that a router went off-line, the impacted services TS data miner module 608 may determine that a customer's billing application software cannot be accessed.

When a problem event 201 occurs, there may be customers that are adversely impacted by that occurrence. An impacted customer TS data miner module 608 accesses databases in, for example, domain managers 224, that contain mappings of infrastructure devices to customers. The customers impacted by the problem event can be categorized. For example, if the customers are departments of an organization, manufacturing may be considered more critical than maintenance. This information is provided to the network administrator for diagnosis and for consideration in taking corrective or mitigating actions. For example, in the above example in which a problem event 201 indicates that a server that has gone off line, impacted customers TS data miner module 608 will show the network administrator which customers utilized that server and, therefore will be with a degraded or inoperable e-mail service.

As noted, each problem event 201 indicates the managed object that caused the generation of the problem event 201. An event details TS data miner module 608 queries domain manager 224 of the managed object to obtain additional information regarding the problem event 201. For example, if the managed object is a network node, the type of device, the type of problem, when the problem occurred, which portion of the managed object experienced the problem, and related information may be retrieved to assist the network administrator.

As noted, contextual instructions 217 are provided to the network administrator for assisting in the diagnosis and correction of a problem event. Such instructions can be stored as part of TS profile 403, or they may be stored separately in an instruction database 208. In the latter embodiment, an event instructions TS data miner module 608 retrieves the relevant instructions from the database 208. Such an instruction database can be provided by the customer of the network specifying customer-specific solutions to the network administrator.

Another type of TS data miner module 608 accesses problem event processor 202 or domain managers 224 to retrieve additional problem events having some specified relationship with the current problem event. Such a relationship can be in time, location of occurrence, type of event, etc. For example, if an email system fails, an associated problem event report for the same device may indicate that the disk space on the server is low. The network administrator can then determine whether the correlation is a reflection of a causation.

TS data miner modules 608 can also automatically executes utilities or tools in system 100. For example, tools such as ping ("ping"), trace router ("traceroute") and disk utilization ("du") are available on servers of network system 100. TS data miner modules 608 run specified utilities and tools automatically, storing the results of those operations in a file.

Other data miners cause the generation of relevant reports. Many domain managers generate reports such as reports providing information regarding network utilization, CPU utilization, etc. For example, if a problem event occurs in an email server, a data miner may request that the domain manager 224 of that node generate a report that identifies the number of emails produced per minute in the time vicinity of the problem event occurrence. In another example in which there is a network outage, a report can be generated that shows the SNMP interface errors that occurred in the hours before the failure.

Another type of TS data miner module 608 generates an overall graphic such as a gauge, bar graph or the like indicating the overall health or topology of the network, as reflected by specified characteristics. Generally, health indicators provide a view of the current state of the specified system, whereas reports provide historical information. For example, if an email server fails, a health indicator reflecting the health of the other email systems. In another example, when a network fails, a health indicator of the surrounding network nodes may be desired. Generally, the data miner accesses the domain managers responsible for the nodes of interest to obtain such information. One suitable troubleshooting data miner module 608 for displaying the topology of a partition 142 of network system 100 is disclosed in U.S. patent application Ser. No. 09/843,887 entitled "SYSTEM FOR DISPLAYING TOPOLOGY MAP INFORMATION THROUGH THE WEB," filed on Apr. 30, 2001, the disclosure of which is hereby incorporated by reference herein in its entirety. One suitable troubleshooting data miner module 608 for displaying the health of an entity in network system 100 is disclosed in U.S. patent application Ser. No. 09/764,563 entitled "METHOD AND APPARAUTS FOR CUTOMIZABLY CALCULATING AND DISPLAYING HEALTH OF A COMPUTER NETWORK," filed on Jan. 17, 2001, the disclosure of which is hereby incorporated by reference herein in its entirety.

As one of ordinary skill in the art would find apparent, additional data miners can be added to database 606 that perform other functions that result in the generation of TS data 207 and/or TS instructions 209. Importantly, this extensibility is beneficial in that new domains can be added to network system 100, such as wireless phone system, the associated domain manager 224 can be included in the performance of this manager, data miner will include data miners to mine that new domain.

A TS module manager 602 manages database 606 of data miners, loading and invoking data miners 608 that are referenced in references 504 in populated TS profile 205. Executing data miners 608 access, call, query, or otherwise interface with external sources such as those noted above to retrieve or cause the generation of TS instructions 207 and TS instructions 209.

A TS portal view window generator 604 displays TS data 207 and TS instructions 209 generated by TS data miner modules 608 in accordance with portal view layout information 502 contained within populated TS profile 205. TS data 207 and TS instructions 209 are presented by troubleshooting GUI 212 as relevant TS data 219 and contextual TS instructions 217. View port layout commands 223 generated by portal view manager 206 instruct troubleshooting GUI 212 how to arrange and display contextual instructions and data 217, 219. Some of the displayed information can be modified by the network administrator, for example, to modify the type or scope of TS data 219. This command 221 is provided to data miner manager 602, which in turn invokes the relevant data miner 608 with modified parameters. The resulting TS data 207 and/or TS instructions 209 are provided to portal view window generator 604 for display as noted above.

III. Operations

FIG. 7 is a high-level flow chart of the operations performed by troubleshooting mentor 126 in accordance with one embodiment of the present invention. At block 702 a problem event is received. Contextual instructions pertinent to troubleshooting the type of problem event received are generated at block 704. In addition, contextual diagnostic data pertinent to the type of problem event are generated at block 704. These instructions and diagnostic data are displayed to the network administrator on a display device for network administrator viewing and, in some embodiments, interaction, at block 706.

FIG. 8 is a more detailed flow charts of the processes performed by troubleshooting mentor 126 at block 702 in accordance with one embodiment of the present invention. At block 802, a problem event 201 generated by a domain manager 224 is received. The received problem event 201 is stored in a repository of problem events that have occurred. This repository of problem events 201 can be viewed by the network administrator. The network administrator selects one of the stored problem events 201 to troubleshoot. This selection is received at block 806.

The type of the problem event selected by the network administrator is determined at block 808. This type determination provides troubleshooting mentor 126 with an indication of the type of troubleshooting diagnostic information and instructions to provide the network administrator.

FIG. 9 is a flowchart of the operations performed at block 704 in accordance with one embodiment of the present invention. At block 902, a database 606 of troubleshooting data miner modules 608 is provided. Such troubleshooting data miner modules 608 include any executable software module that retrieves or causes the generator of diagnostic data. As noted, diagnostic data includes any historical or contemporaneous information helpful to the evaluation and analysis of problem events 201.

At block 904 a database 408 of TS profiles 403 is generated. Each such TS profile 403 is an executable module designed to invoke certain troubleshooting data miner modules 608. Each such troubleshooting module 608 generates or causes the generation of diagnostic data pertinent to troubleshooting a particular problem event 201.

At block 906 the problem event selected by the network administrator to troubleshoot, followed by block 908 during which a TS profile 403 corresponding to a selected problem event 201 is retrieved from database 408 and populated with information pertaining to the selected problem event.

Once executed, at block 910 the invoked TS profile 403 calls one or more TS data miner modules 608 referenced in the executed TS profile 403 to generate or cause the generation of TS instructions and TS diagnostic data.

Figure 10:
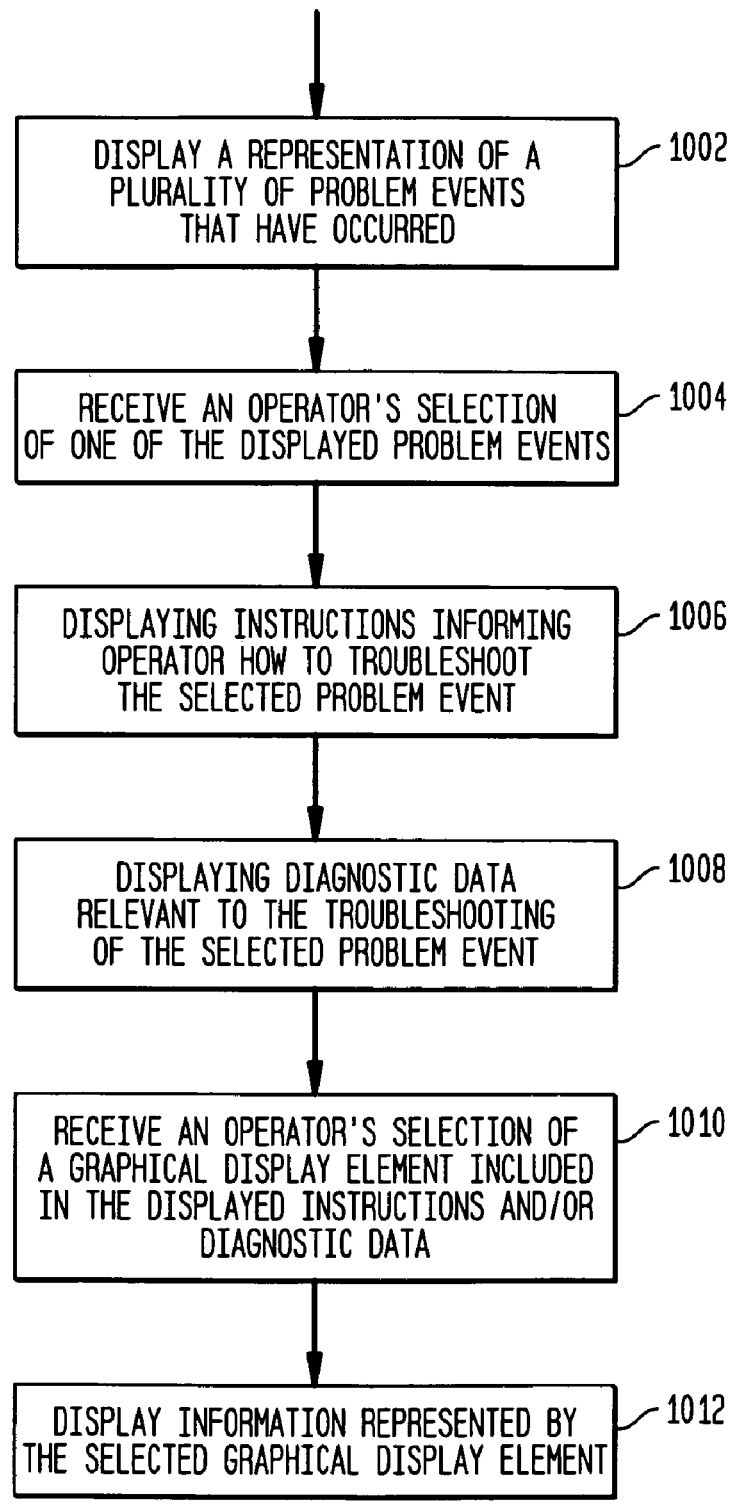
FIG. 10 is a flow chart illustrating the user interface display operations in one embodiment of the present invention.

FIG. 10 is a flow chart illustrating the user interface display operations in one embodiment of the present invention. At block 1002, a representation of a plurality of problem events that have occurred in network system 100 is displayed. This representation can take on any form, such as graphical or textual identifiers, associated descriptions, and the like.

At block 1004, an network administrator selection of one of the displayed problem event representations is received. Such a selection can occur using any graphical selection device such as a mouse, trackball, light pen, keyboard and the like. In response to the network administrator selection received at block 1004, contextual diagnostic data and instructions informing the network administrator how to troubleshoot the selected problem event is displayed at block 1006. In addition, at block 1008 diagnostic data pertinent to troubleshooting the particular problem event is displayed. Such diagnostic data is retrieved from or generated by relevant entities in network system 100.

In one embodiment, included in the display of such context-sensitive instructions and diagnostic data, graphical display elements representing the pathway to additional, more detailed information is provided. Any type of graphical display element such as hyperlinks, buttons, menus, icons and the like can be displayed. In such embodiments, receipt of an network administrator graphical selection of once such graphical display element is received at block 1010. In response, at block 1012, the information represented by the selected display element is displayed. If the selected display element appeared in association with a troubleshooting instruction, the additional information may include, for example, an explanation of why that troubleshooting step is to be performed, low-level steps that can be taken to perform the troubleshooting step, etc. If the selected display element appeared in association with diagnostic data, the additional information may include, for example, more detailed diagnostic data.

The network administrator can then view the context-sensitive troubleshooting instructions and diagnostic data and follow the procedures offered to rectify the selected problem event. Thus, this graphical display process guides the network administrator through the troubleshooting process, facilitating the efficient identification and correction of the cause of the event.

IV. Examples

Two examples of TS profile 205 of the present invention will now be described with reference to a corresponding troubleshooting view window displayed generated by the processing of the exemplary troubleshooting (TS) profile.

Figure 11:
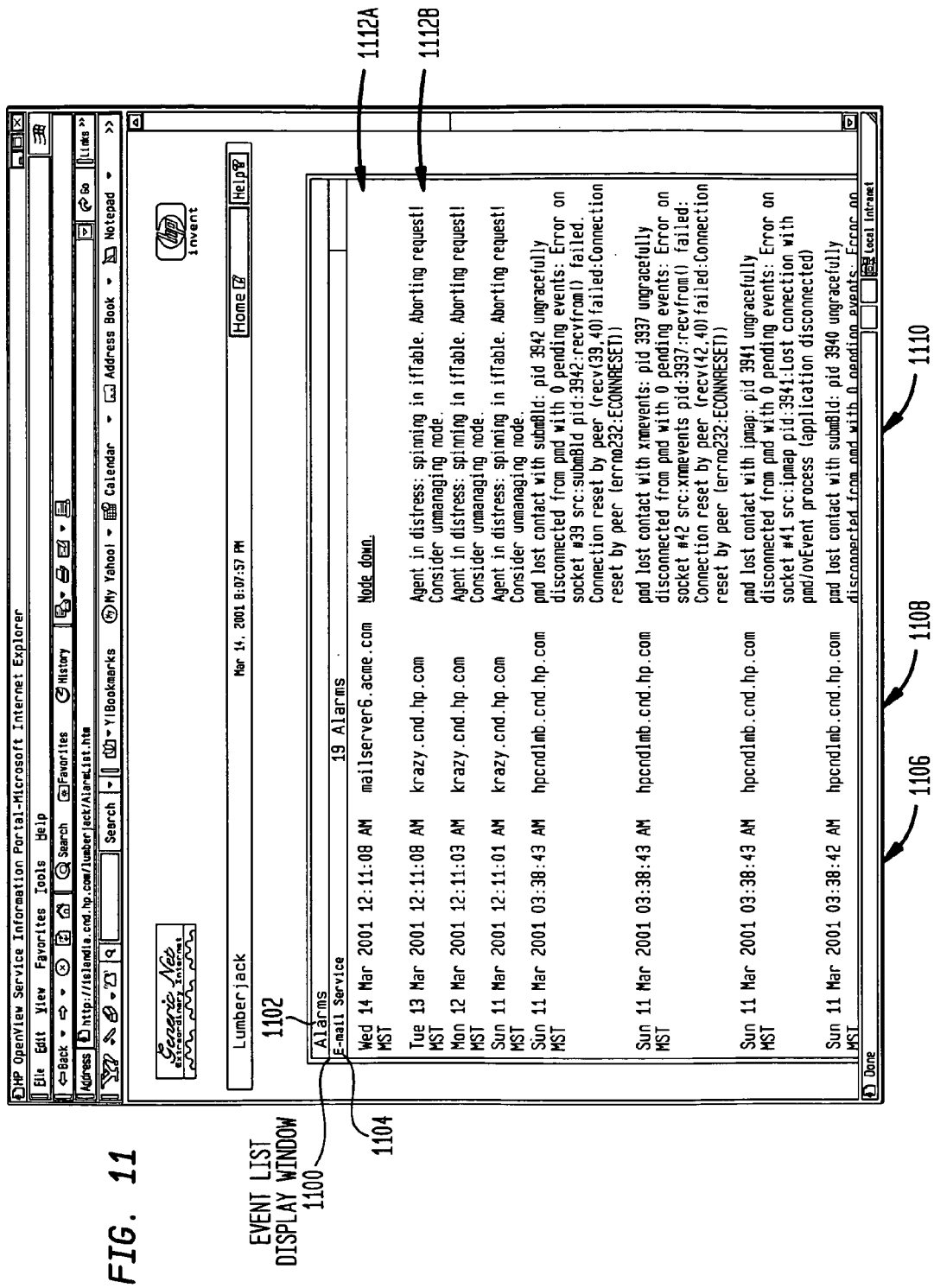
FIG. 11 is an illustration of a graphical user interface display window showing an example of a problem event list generated by the troubleshooting mentor of the present invention.

FIG. 11 is an illustration of a graphical user interface display window displayed by problem event GUI 210 to display a problem event list 213 generated by problem event processor 202. Event list display window 1100 is titled "Alarms" 1102 and provides problem events 201 listed according to category. In this illustrative example, the problem events 201 associated with E-mail service are displayed. A subtitle line 1104 is included in view window 1100 to identify the category of the displayed problem events 201. As shown in subtitle bar 1104, the number of problem events ("19 Alarms") is displayed.

For each problem event 201, three data values are provided in row-adjacent manner. The first data value 1106 provides the time of occurrence of the problem event, the second data value 1108 provides the device of occurrence of the problem event, and a brief description.

Of the displayed problem events, the network administrator selects using a pointing device such as a computer mouse or other graphical selection device the first problem event 201 in the displayed problem event list 213. This selected problem event occurred at the node "mailserver6.acme.com" on Mar. 14, 2001, 12:11:08 AM MST. The problem event is referred to as "Node down." Th emphasis this selection in the Figure, the descriptor "Node down" is underlined.

Figure 12:
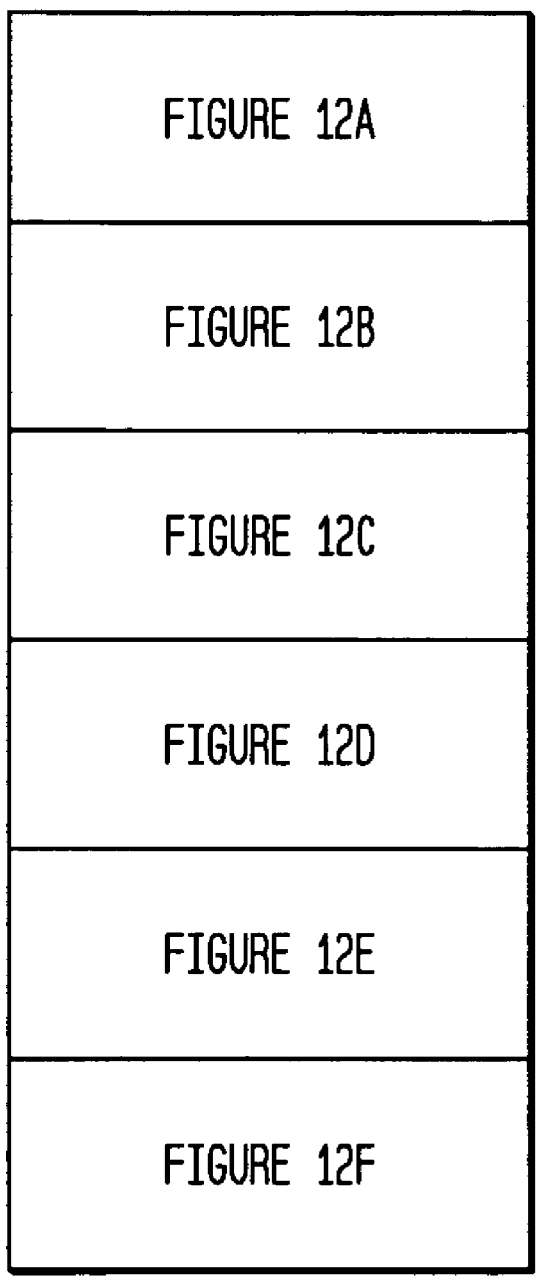
FIG. 12 is an illustration of the relationship between FIGS. 12A–12F.

In response to this problem event selection 215, problem event processor 202 generates event data 203 that is processed by troubleshooting profile manager 204 to categorize the problem event 1112A and to load TS profile 205 associated with that categorization. In this exemplary embodiment, the troubleshooting category is entitled "Connectivity" and a resulting troubleshooting profile 1200 is populated and provided in portal view manager 206 as populated TS profile 205. This TS profile, referred to herein as TS profile 1200, is displayed in FIGS. 12A–12F. The relationship between FIGS. 12A–12F is illustrated in FIG. 12. This particular TS profile 1200 is in XML format. FIGS. 13A–13D are illustrations of different portions of a TS view window 1300 generated by troubleshooting portal view manager 206 when implementing TS profile 1200. TS profile 1200 and TS view window 1300 will be described in detail below. In FIGS. 13A–D there are a series of TS data windows 1302 each presenting troubleshooting information for a particular TS data miner module 608. TS profile 1200 and corresponding TS view window 1300 will now be described in detail.

Lines 1 and 2 of TS profile 1200 include standard header information for an XML document, identifying the version and type of document. The content and format are well known.

Figure 13A:
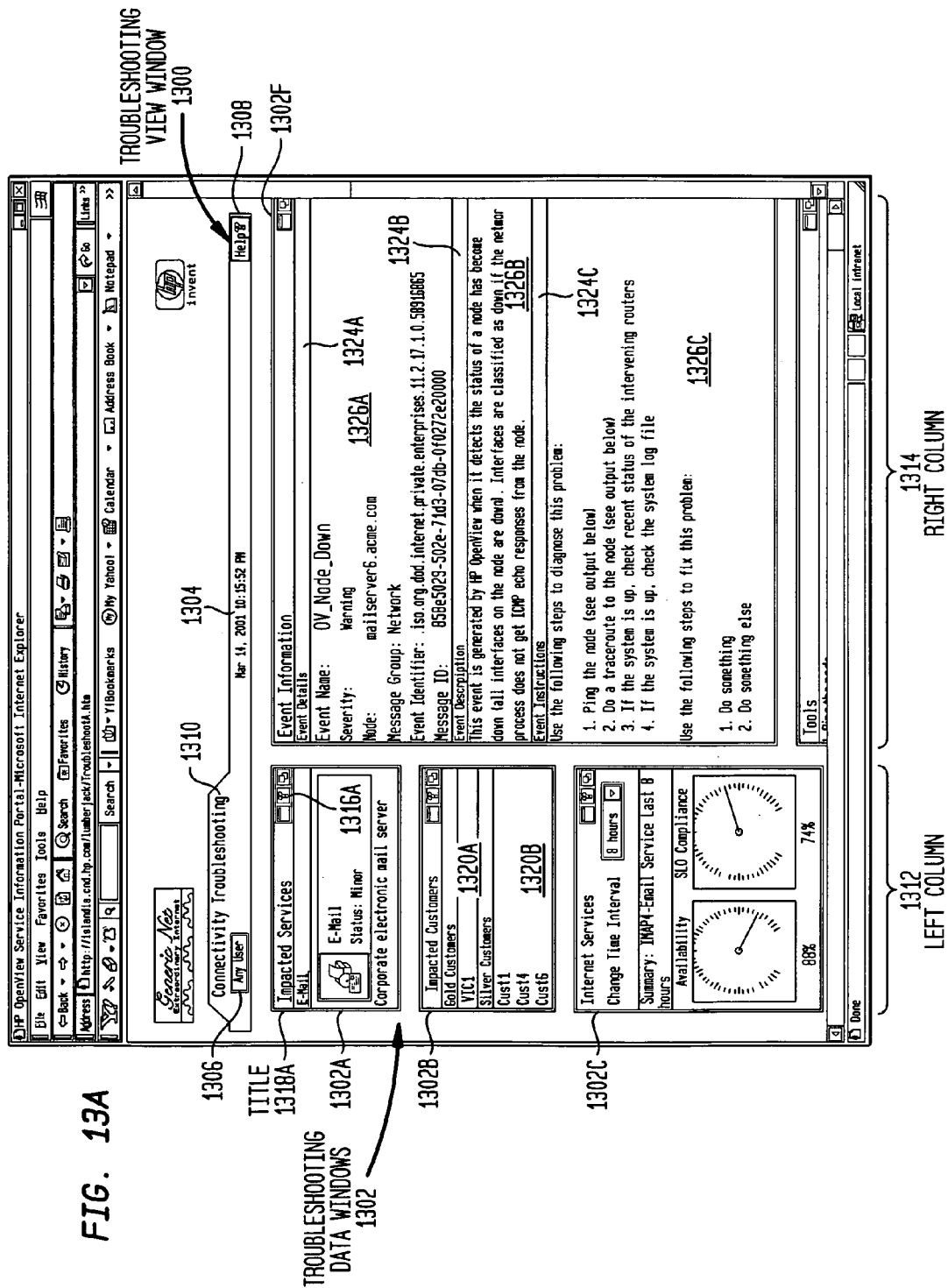
FIGS. 13A–13C together illustrate a troubleshooting view window displayed in response to the execution of the TS profile illustrated in FIGS. 12A–12F in accordance with one embodiment of the present invention.

Lines 3–10 define attributes that apply to the entire TS view window 1300. In this illustrative embodiment, these attributes are identified by the element "PortalView" and include information such as the color scheme (color-Scheme="/OvSipDocs/styles/default.css") at line 4, the view window identifier (defaultSheetID="Troubleshoot") and refresh rate (refreshRate="3600") at line 5. At lines 6 and 7 the date 1304 and user name 1306 are set to appear. In view window 1300, these values appear in the boarder 1308 of TS view window 1300. At lines 8 and 9 the view window ID (Sheet id="Troubleshoot") is provided along with the name "Connectivity Troubleshooting" (title="Connectivity Troubleshooting") for display. In this illustrative embodiment, TS view window 1300 is a tabbed window. The specified title is shown in the body of tab 1310 of TS view window 1300, as shown in FIG. 13A.

In the embodiment shown in FIG. 13, the troubleshooting information provided to the network administrator in accordance with the present invention is displayed in a two column format. This facilitates the condensed display of context-sensitive information in a single view window. The attribute specified at line 10 establishes a column format for view window 1300, along with the width of the left column (Column width="narrow"). Referring to FIG. 13, this results in a TS view window 1300 having a plurality of TS data windows 1302 arranged in two columns: a left column 1312 and a right column 1314. The selection of a narrow column width for left column 1312 and a wider column width for right column 1314 facilitates the optimal use of display space in troubleshooting view window 1300. Information that can be condensed or summarized is located in left column 1312 while information that can not is located in right column 1314.

TS profile 1200 includes, as noted, portal view layout information 502 and TS data miner module references 504. In the embodiments illustrated in FIG. 12, TS profile 1200 includes ten (10) TS module references 504, referred to as TS module references 1206A–1206J. As noted with reference to FIG. 5, each such TS module reference 504 typically includes one or more configuration parameters 506 that specify the functions to be performed by the referenced TS data miner module 608.

Each TS module reference 1206 is segregated into a block of XML code. This block structure of XML code begins with a element "<ModuleInstance" and ends with the corresponding XML line of code "</ModuleInstance>." There are a series of attributes included in "<ModuleInstance" that define this instance of the invoked TS module 608. The attributes include a unique TS module identififier ("classid") that uniquely identifies the referenced TS module 608. This is followed by one or more parameters that identify general as well as specific attributes including, for example, display formats, location of help files, the identification of the managed object, problem event and the associated domain manager 224. As one of ordinary skill in the art would find apparent, these attributes can and will vary for different TS modules 608. Included within each reference block 1206 there are one or more configuration parameters 5096 that are passed to the referenced TS module 608 when that module is invoked. These configuration parameters 506, as noted, specify the functions to be performed by the referenced TS data miner module 608, including but not limited to, the type and breadth of troubleshooting information sought. This too will vary depending on the type of TS data miner module 608, type of problem event and type of domain manager 224, among other factors. Specific examples shown in XML TS profile 1200 will now be described.

The first TS module reference 1206A is provided at lines 11–19 of TS profile 1200. The resulting TS data window 1302A displayed by portal view manager 206 in response to the processing of this block of code is shown in FIG. 13A as TS data window 1302A. This particular TS data miner module 608 determines which services are impacted by the occurrence of the selected problem event 215.

The XML line of code at line 11 "<ModuleInstance" indicates the beginning of this TS module reference block of code 1206A. The unique identifier for this particular TS data miner module 608 is provided at line 12 (classid="com.hp.ov.portal.modules. service.SvcCardServlet"). The results will be displayed (display="yes"). The next attribute is a display attribute (rollupState="down") indicating to GUI 212 how to display the troubleshooting data provided by the referenced TS module 608, followed by an internal identifier for this instance of the data miner (id="my6").

At line 14 a help file URL (help="/OvSipDocs/C/help/SvcCard/cardView.htm") is specified. Referring to FIG. 13A, a help button 1316A is provided on TS data window 1302A. A similar help button is also displayed in the other TS data windows 1302. The help file specified at line 14 is linked to help button 1316A by portal view manager 206. Such a help file can provide any desired information to assist the network administrator with information regarding the reference TS module 608 and resulting TS data display 1302. Such a help display can include references or links to other sources of information. The title 1318A for this troubleshooting data window 1302A is Impacted Services, as specified on line 15 (title="Impacted Services"). As shown in FIG. 12A, these parameters that specify attributes for this instance of the invoked TS module 608 are presented with the Module Instance reference within opening and closing brackets (<>).

The lines of code 16–18 are parameters that are passed to the TS data miner module 608 identified in the classid (line 12). For this TS data miner module 608, the parameters are bound by <ServiceCard . . . > and </ServiceCard> elements. This is a syntax expected by this particular TS module 608. Between these elements, the referenced TS module 608 is instructed not to retrieve detailed information (details="no") at line 16 and that the domain manager 224 in network system 100 that contains the requested information is bacchusn (server="bacchusn"). The service of interest on the identified server; that is, the service for which the impact of the problem event 201 is desired, is the email service (ServiceRef name="email"). Referring to FIG. 13A, Impacted Services data window 1302A is shown at the top of left column 1312. TS module 608 returned TS data 207 indicating that the impacted service is the E-Mail service located on the corporate electronic mail server (mailserver6.acme.com), and that the impact ("Status") is minor.

The next TS module reference 1206B invokes a TS data miner module 608 that determines the customers that may be impacted by a selected problem event 215. This TS module reference 1206B includes lines 20–39 of TS profile 1200, as illustrated in FIGS. 12A and 12B. The module instance attributes parameters are similar to those noted above in connection with TS module reference 1206A. These include the unique data miner (classid="com.hp.ov.portal.modules.ovgeneric"), that the results are to be displayed (display="yes"), the location of the corresponding help file (help="/OvSipDocs/C/help/examples/integ.html"), the internal instance identifier (id="Generic100"), the display window display element (rollupState="down") and the title to be displayed on the troubleshooting display window (title="Impacted Customers"). Referring to FIG. 13A, the resulting TS data window 1302B generated by portal view manager 206 is shown in left column 1312.

The syntax required by this TS module 608 include the module (<Generic> and </Generic>) and sub-module (<Submodule> and </Submodule>) elements. The customer data accessed by this TS module 608 is categorized in relative terms based on predetermined characteristics of each customer. In this example, of the number of categories that can be established, the identification of customers that fall into two categories, "Gold" and "Silver" customers, each requested in a separate sub-module. For each sub-module, a title bar is identified (<TitleBar title="Gold Customers"/> at line 28 and <TitleBar title="Silver Customers"/> at line 33). Referring to FIG. 13A, the two categories of information are identified by partitioning data window 1302B into two regions 1320A and 1320B, one with a title bar "Gold Customers", the other with a title bar "Silver Customers", as specified in TS profile 1200. The location of the information sought is identified for each sub-module (for gold customers, <EmbeddedHtml data="<strong> VIC1</strong>"/> at lines 29 and 30; for silver, <EmbeddedHtmldata="<strong>Cust1<br> Cust4<br>Cust6</strong >"/> at lines 35 and 36 of TS profile 1200. Referring to FIG. 13A, the referenced TS module 608 returns troubleshooting data 207 indicating that one Gold customer, VIC1, and three silver customers, Cust1, Cust4 and Cust5) are impacted by the occurrence of the selected problem event 215.

The next TS module reference 1206C invokes a TS data miner module 608 that retrieves data related to specified internet services and presents them in a graphical format. This TS module reference 1206C includes lines 40–52 of TS profile 1200, as illustrated in FIG. 12B.

The module instance attributes are similar to those noted above and are not described further here. Referring to FIG. 13A, the TS data window 1302 for this TS data miner module 608 is Internet Services data window 1302C located in left column 1312.

The parameters that are passed to the referenced TS data miner module 608 are bounded by <VPIS . . . > and </VPIS> elements. As with the other TS module references 1206A and 1206B, this is the syntax specified by the referenced TS module 608. The first attribute within this block of parameters identifies the number of days of data to obtain when generating the requested information (days="30"), and the time interval between successive data points (hours="1"). Of the available internet service performance characteristics that can be analyzed, reports for two such internet service characteristics are requested. The availability of the service (ServiceType availability="yes") and the percentage of service violations that have occurred, referred to as SLO Compliance (serviceLevelViolations="yes") were requested. The other available internet service performance characteristics were not requested. These include service availability (availabilityReport="no"), the response time of the internet service (responseTime="no") and its details (ResponseTimeComponents="no"). In addition, the generation of a report that identifies the violations that occurred at each level of service (ServiceLevelViolationsReport="no") was not requested. Also included in these parameters is the aspect of the email service to be analyzed. Here, the protocol used by email servers to communicate with the email interface on individual machines, IMAP-4 is specified (name="IMAP4—Email Service").

Referring to FIG. 13A, Internet Services data window 1302C is shown. The title of window 1302C is "Internet Services" in accordance with the specified module instance attributes. There is also a text box in which the network administrator can enter the time interval for the specified data. As noted, this enables the network administrator to modify the parameters set forth in a TS profile 205 should the default values not provide the insight desired. The entered specification data is generated by GUI 212 as part of network administrator TS commands 221.

In TS display window 1302C the field is entitled "Change Time Interval", and can be used by the network administrator to change the default value of 30 days to another time period. In this example, the network administrator changed the time period to 8 hours.

Below this information, portal view manager 206 displays the aspect of the service that was analyzed and the period of time over which the displayed data occurred ("Summary: IMAP4—Email Service Last 8 Hours"). Since two characteristics of this service were requested, two gauges are displayed with their relevant titles. In addition, a numeric display is also provided.

Figure 13B:
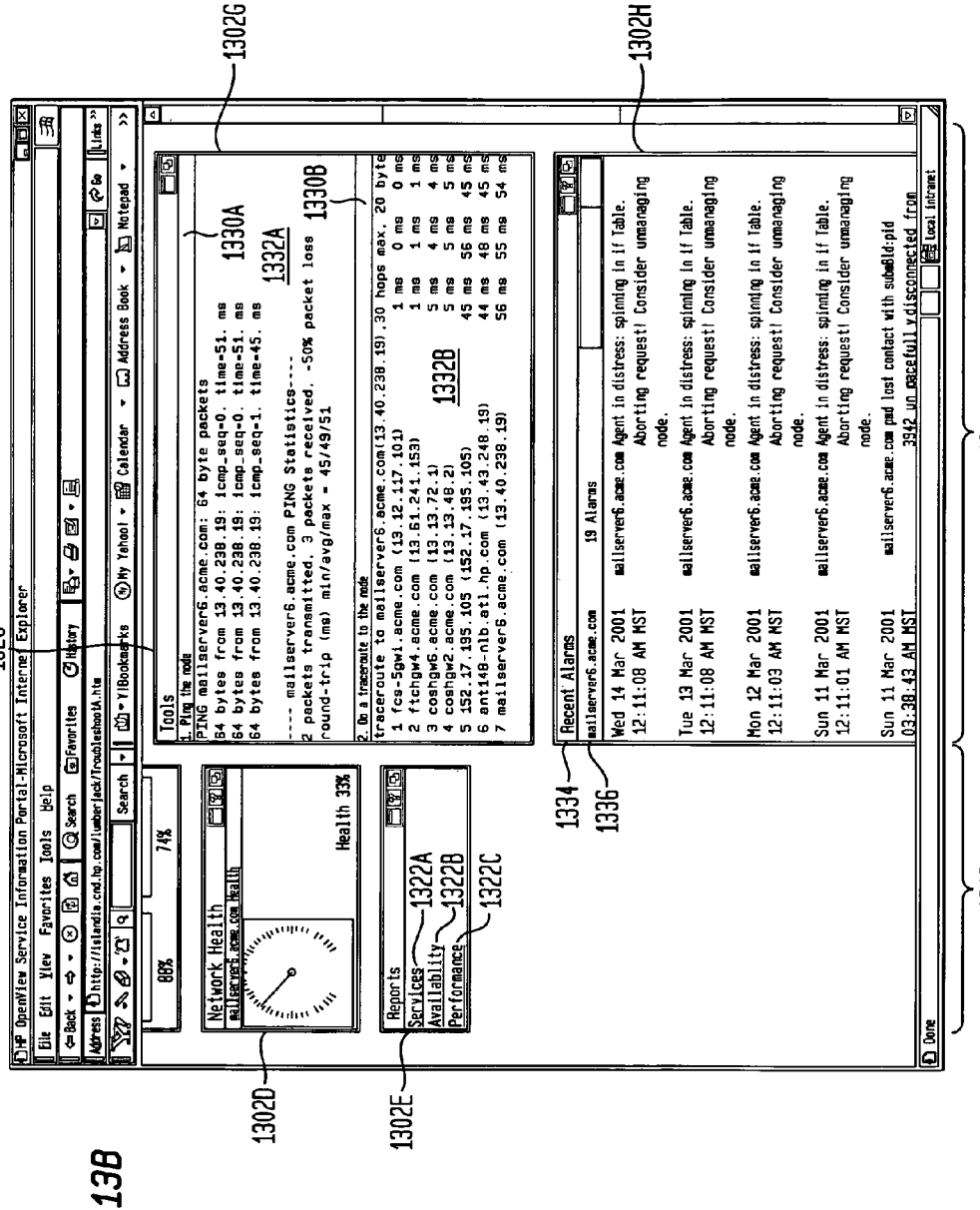

The next TS module reference 1206D invokes a TS data miner module 608 that accesses a number of databases on network system 100 to determine the health of the underlying network system 100. This TS module reference 1206D includes lines 53–74 of TS profile 1200, as illustrated in FIGS. 12B and 12C. The module instance attributes parameters are similar to those noted above in connection with TS module reference 1206A. These include the unique data miner (classid="com.hp.ov.portal. modules.health"), that the results are to be displayed (display="yes"), the location of the corresponding help file (help="/OvSipDocs/C/help/ nmHealth/healthView.html"), the internal instance identifier (id="module25"), the display window display element (rollupState="down") and the title to be displayed on the troubleshooting display window (title="Network Health"). Referring to FIG. 13B, the resulting TS data window 1302D generated by portal view manager 206 is shown in left column 1312.

The lines of code 59–69 are parameters that are passed to the referenced TS data miner module 608 identified in the classid (line 54). For this TS data miner module 608, the parameters include a request that detailed information pertaining to network health determination not be provided (NetworkHealth showRawData="no"). Also, there are some devices that have an unknown state. In this example, such devices are not included in the health determination (showUnknown="no"). A summary format for the display is requested (Summary display="yes") in which the level of data to be displayed is at a level 3 of 5 levels (display- Depth="3"). The managed object which experienced the selected problem event 215 is provided. Here, problem event 215 is a network node that is not responding. Accordingly, the managed object title is the node ID appended by the work "health" (title="mailserver6.acme.com Health").

TS profile 1200 also specifies which aspects of the system are going to be considered in rendering this health determination, along with how the specified aspects are to be weighted relative to each other. In this example, a single aspect to be considered in determining the health of the network is the health of the network interface (Component href="#IfHealth" vital="no" weight="1"). It should be appreciated that each such component corresponds with an SNMP variable, of which there are thousands, and that any number and combination of components can be specified to contribute to the health determination.

Referring to FIG. 13B, troubleshooting data window 1302D has a title of "Network Health" in accordance with the module instance attribute specifications. The next line in display window 1302D is the title specified at line 62 of TS profile 1200, "mailserver6.acme.com Health". A single gauge and associated numerical display is shown indicting that the overall health of the specified system, as reflected in the selected component(s), is 33%.

The parameters can include an indication of which objects to consider when determining the overall health. To shown the health of all servers including the specific managed object, a node selection parameter can be included (<NodeSelection id="Servers" op="AND" title="Servers">). In addition, certain information can be filtered. Here, nodes that include the specified managed object and the server coleman.cnd.hp.com are considered (<IPHostFilter op="OR">; <IPHost hostname="coleman.cnd.hp.com"/>). It should be appreciated that nay selected data can be displayed in any graphic format.

The next TS module reference 1206E invokes a TS data miner module 608 that references predetermined report generators located on domain managers 224. This TS module reference 1206E includes lines 75–94 of TS profile 1200, as illustrated in FIG. 12C. The module instance attributes parameters are similar to those noted above in connection with other TS module references 1206. These include the unique data miner (classid="com.hp.ov.portal.modules.bookmarks"), that the results are to be displayed (display="yes"), the location of the corresponding help file (help="/OvSipDocs/C/help/bookMark/bookmkView.html"), the internal instance identifier (id="my1450"), the display window display element (rollupState="down") and the title to be displayed on the troubleshooting display window 1302 (title="Reports"). Referring to FIG. 13B, the resulting TS data window 1302E generated by portal view manager 206 is shown in left column 1312.

After the element indicating the beginning of a list of reports (<Bookmarks>), the referenced TS data miner module 608 provides the URL for each of three report generators each identified with the syntax "<Entry . . . />". Within each entry there is a URL to the report generator, a location to send the report, and the title of the displayed link to the URL. For example, selection of the link 1322A, entitled "Services" per line 84 of TS profile 1200, invokes a report generator ("http://sushi.bbn.hp.com/OvSipDocs /C/reports/ito_service_history_yesterday/default.htm") provided at lines 82 and 83 of TS profile 1200 that provides a separate view with detailed information regarding the services relevant to problem event 215. Similar report generators are specified at lines 86–87 and 90–91 of TS profile 1200, entitled "Availability" 1322B and "Performance" 1314C per lines 88 and 92, respectively, of TS profile 1200.

When invoked by the network administrator, each report generator generates a report that can provide a large quantity of detailed information in a separate display window. Thus, a TS profile 403 can include certain such report generator URLs that are relevant to the selected problem event 215 and the troubleshooting process to diagnose and correct the cause of such a problem event.

At line 95 of TS profile 1200 there is a column element. This causes troubleshooting portal view manager 206 to advance the display of the subsequent display windows 1302 in a next column. Accordingly, the Reports display window 1302E is the last display window of left column 1312 in troubleshooting view window 1300. The next column, right column 1314 is specified in line 96 of TS profile 1200 as being presented in a wide format.

The next TS module reference 1206F invokes a TS data miner module 608 that retrieves problem event data. This TS module reference 1206F includes lines 97–121 of TS profile 1200, as illustrated in FIGS. 12C and 12D. The module instance title is "Event Information" as shown in display window 1302F illustrated in FIG. 13A. The remainder of the module instance definition is similar to those described above.

The syntax required by this TS module 608 include the module (<Generic> and </Generic>) and sub-module (<Submodule> and </Submodule>) elements. Each sub-module generates TS data 207 that is displayed in a predetermined region of the corresponding TS display window 1302F.

This TS module reference 1202F includes three sub-modules, each of which sets forth parameters to be passed to the referenced TS data miner module 608. This specific TS module 608 performs a combination of data mining operations, as evidenced from the TS data 207 and TS instructions 209 displayed in TS data window 1302F. Each set of parameters specifies a sub-title and corresponding data that is ultimately displayed in a portion of display window 1302F.

The first sub-module extends from lines 102–107. The passed parameters specify the title to be displayed at line 103 (TitleBar title="Event Details"), as shown by title 1324A in display window 1302F. The format of the displayed event data is to be either text or HTML (type="text/html") and stored in the designated file (fileName="$SIP_HOME_DIRconf/share/events/detailsA"). The information shown in region 1326A of window 1302F is stored in the designate file and displayed to the network administrator as shown in FIG. 13A. The event details displayed include, in this example, the name of the problem event, the severity of the impact of the occurrence of the problem event, the identification of the managed object, here a network node, the associated event category specified by, perhaps, the responsible domain manager 224, and the specific event and message identifiers.

The next sub-module is provided at lines 108–113 and specifies that the retrieved description of the problem event have an associated subtitle "Event Description", as specified at line 109. The text/html output is stored in the file (fileName="$SIP_HOME_DIRconf/share/events/descriptionA") designated at lines 111–112, and displayed in region 1326B of data display window 1302F. The TS module 608 specified at lines 98–99 may retrieve this information from the same or different location than the TS data 207 displayed in region 1322A. Referring to FIG. 13A, the displayed event description is a natural language description of the problem event 215 identified in region 1326A.

The final sub-module is provided at lines 114–119 of TS profile 1200, causing the TS module 608 to provide instructions to the network administrator for troubleshooting this problem event. The passed parameters specify the subtitle "Event Instructions" 1324C at line 115, and the storage of the retrieved instructions at a file (fileName="$SIP_HOME_DIRconf/share/events/ instructionsA") specified at line 117–118. These event instructions can be retrieved from the same or different location as the other information presented in window 1302F. This TS instructions 209 are displayed in region 1326C of TS data display window 1302F.

The next TS module reference 1206G invokes a TS data miner module 608 that causes the execution of two system utilities or tools 610. This TS module reference 1206G includes lines 122–140 of TS profile 1200, as illustrated in FIGS. 12D and 12E. The module instance attributes parameters are similar to those noted above in connection with other TS module references. The module instance is defined at lines 122–125, identifying the data miner 608 and specifying the title 1328 to be "Tools." This is illustrated in FIG. 13B by the term "Tools" appearing in the title bar of window 1302G. Referring to FIG. 13B, the resulting TS data window 1302G generated by portal view manager 206 is shown in right column 1314.

The lines of code 126–139 are parameters that are passed to the referenced TS data miner module 608 identified in the classid (line 123). For this TS data miner module 608, the parameters are embedded in the syntax noted above, module (<Generic> and </Generic>) and sub-module (<Submodule> and </Submodule>) elements, with each such sub-module invoking and displaying a different system utility. Each sub-module generates TS data 207 that is displayed in a predetermined region 1332 of the corresponding TS display window 1302G.

The two utilities/tools are ping and traceroute, both of which are well known in the network art. The parameters set forth in the first submodule specify the Ping system tool 610 at line 130 (fileName="$SIP_HOME_DIRconf/share/ events/ping") and, at line 128, that the information is to be displayed in association with a subtitle "Ping" (TitleBar title="Ping"). A common protocol for network performance monitoring and troubleshooting is ICMP (Internet Control Message Protocol). ICMP supports ping an echo messages, which are round-trip messages to a particular addressed network device and then back to the originator. By issuing a ping to a network device, the network administrator can determine whether the network device is online or offline on the basis of whether the ping message is returned to the manager. Because the ICMP protocol or other ping messages are universally supported, the network administrator can determine the significant status information for a network device. The ping utility queries the designated server and returns information regarding the status of the test communication as specified by the remaining parameters at lines 128–131. The results of the ping utility are displayed in region 1332A in accordance with the passed parameters. The second sub-module is defined at lines 133–138 is similar in format and structure. The results of the traceroute utility are displayed in region 1332B in accordance with the passed parameters.

The next TS module reference 1206H invokes a TS data miner module 608 that retrieves alarm data. This TS module reference 1206H includes lines 141–150 of TS profile 1200, as illustrated in FIG. 12E. Referring to FIG. 13B, the resulting TS data window 1302H generated by portal view manager 206 is shown in right column 1314. The module instance attributes parameters are similar to those noted above in connection with other TS module references. The module instance is defined at lines 151–155, identifying the TS data miner module 608 and specifying the title 1328 to be "Recent Alarms." This is illustrated in FIG. 13B by the term "Recent Alarms" appearing in the title bar 1334 of window 1302H.

The referenced TS module 608 (classid="com.hp.ov.portal.modules.alarms") generates a request to event consolidator 302 to provide all recent alarms generated by the managed object, here node mailserver6.xml (CategoryDefName href="mailserver6.xml"). This alarm information is displayed in TS data window 1302H under the specified title "Recent Alarms". As shown therein, the noted node is identified as the source of all 19 alarms in a sub-header 1336.

Figure 13C:
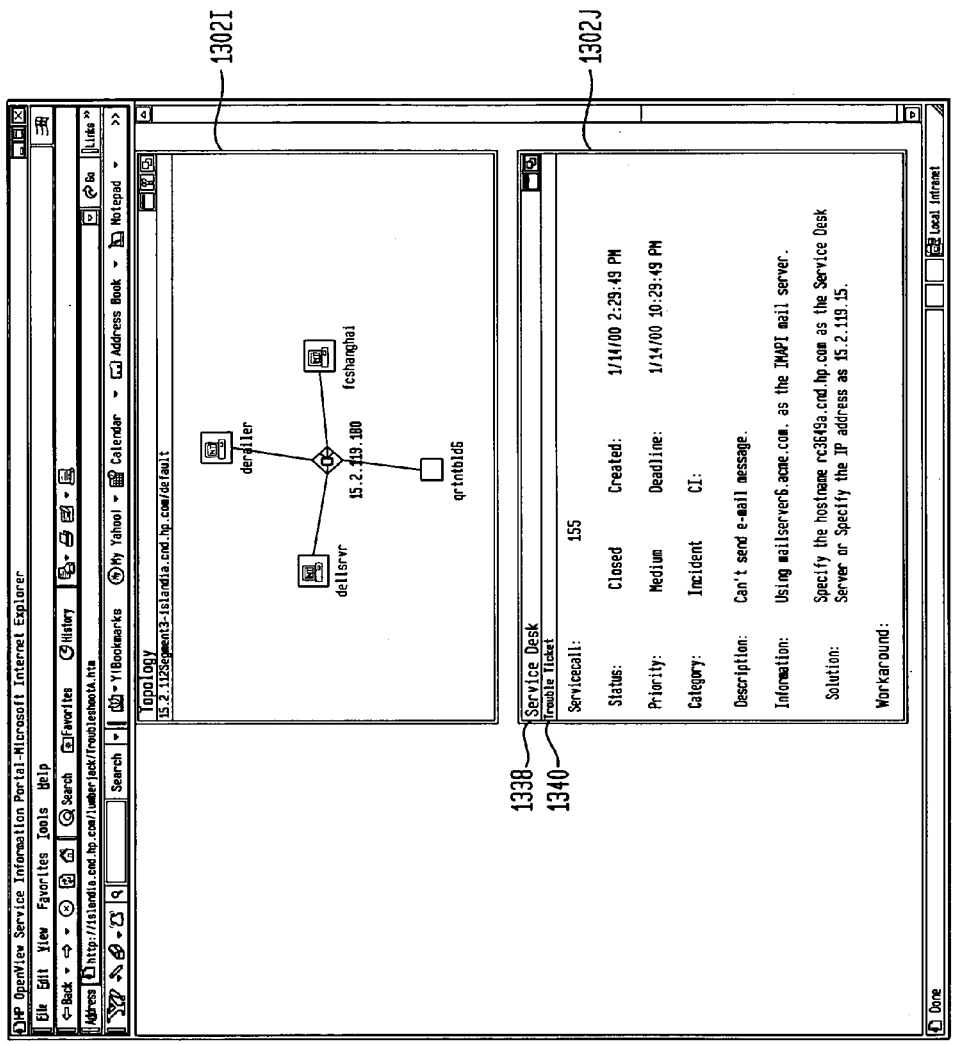

The next TS module reference 1206I invokes a TS data miner module 608 that that generates a topology map in accordance with the specified parameters. This TS module reference 1206I includes lines 151–163 of TS profile 1200, as illustrated in FIG. 12E. Referring to FIG. 13C, the resulting TS data window 1302I generated by portal view manager 206 is shown in right column 1314.

Here, the passed parameters include a instruction not to provide lower level details of the topology map (TopologyMap drillDown="no"), to show the status of the displayed nodes (showStatus="yes"), and to the specified portion of the show 3 levels of branches (Submap href="ovw:/islandia.cnd.hp.com/default/15.2.112. Segment3") with the node that experienced problem event at the center of the topology map (Submap object="mailserver6.xml"). Referring to FIG. 13C, the resulting display window 1302I is illustrated.

As noted, the network administrator can also receive an indication of a problem event directly from a customer on network system 100. Such a customer may call or email the network administrator and provide a description of the problem event. The network administrator enters this information into problem GUI 210 which provides it to problem event processor 202 as a manual problem event 211. This information is then stored in problem event list 213 along with problem events 201. These manually entered problem events are referred to as "Trouble Tickets" in this illustrative embodiment.

Figure 12F:
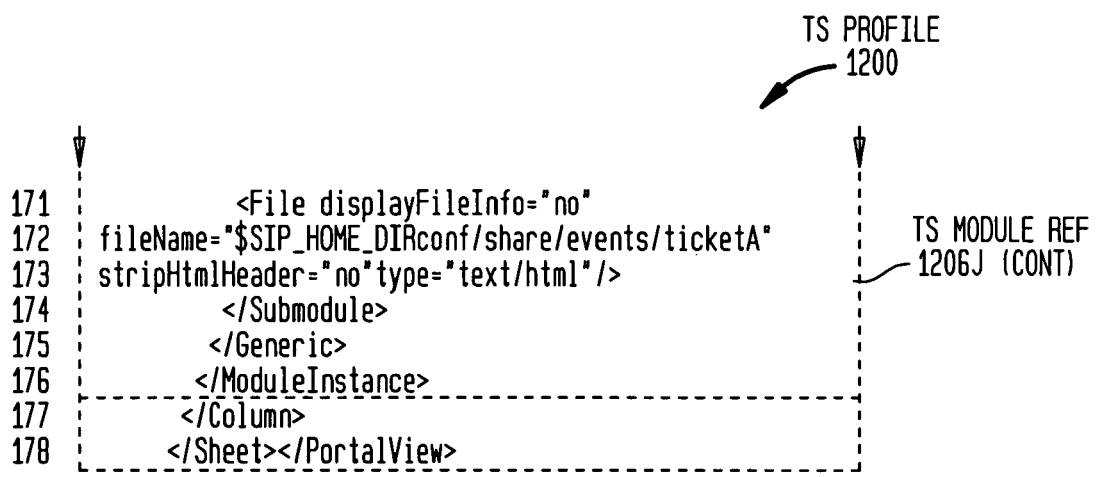

The next TS module reference 1206J invokes a TS data miner module 608 that retrieves relevant Trouble Tickets from event processor 202. This TS module reference 1206J includes lines 164–176 of TS profile 1200, as illustrated in FIGS. 12E and 12F. Referring to FIG. 13C, the resulting TS data window 1302J generated by portal view manager 206 is shown in right column 1314.

The title of this display window 1302J is "Service Desk" as shown in the title bar 1338 and specified at line 167 of TS profile 1200. The "<Generic>" and "<Submodule>" syntax is included, with each sub-module providing parameters directed to the retrieval of certain related problem events. In this particular embodiment, Trouble Tickets related to the specified problem event 215 are retrieved and displayed. Referring to FIG. 13C, the sub-title bar 1340 is titled "Trouble Tickets" as specified by the parameter at line 170. The retrieved problem events are displayed in accordance with the parameters at lines 171–173. There, the display file information is not included (File displayFileInfo="no") and the name of the file from which to retrieve the Trouble Ticket (fileName="$SIP_HOME_DIRconf/share/events/ticketA")

is specified. The text/html documentation is provided with stripping the HTML header (stripHtmlHeader="no"; type="text/html").

Referring to FIG. 13C, the information relevant to the specified trouble ticket is displayed. This information includes the service call identifier, the status of the problem event, when it was created. Other information includes the priority assigned by the network administrator and the deadline by which the problem event is to be corrected. Other information related to correcting the problem is also included such as a description of the problem event, related information, the solution proposed and workaround approach should the problem event persist.

At lines 177 and 178 the column element indicates that the second column is and the default framework for the portal view layout is completed.

Figure 14:
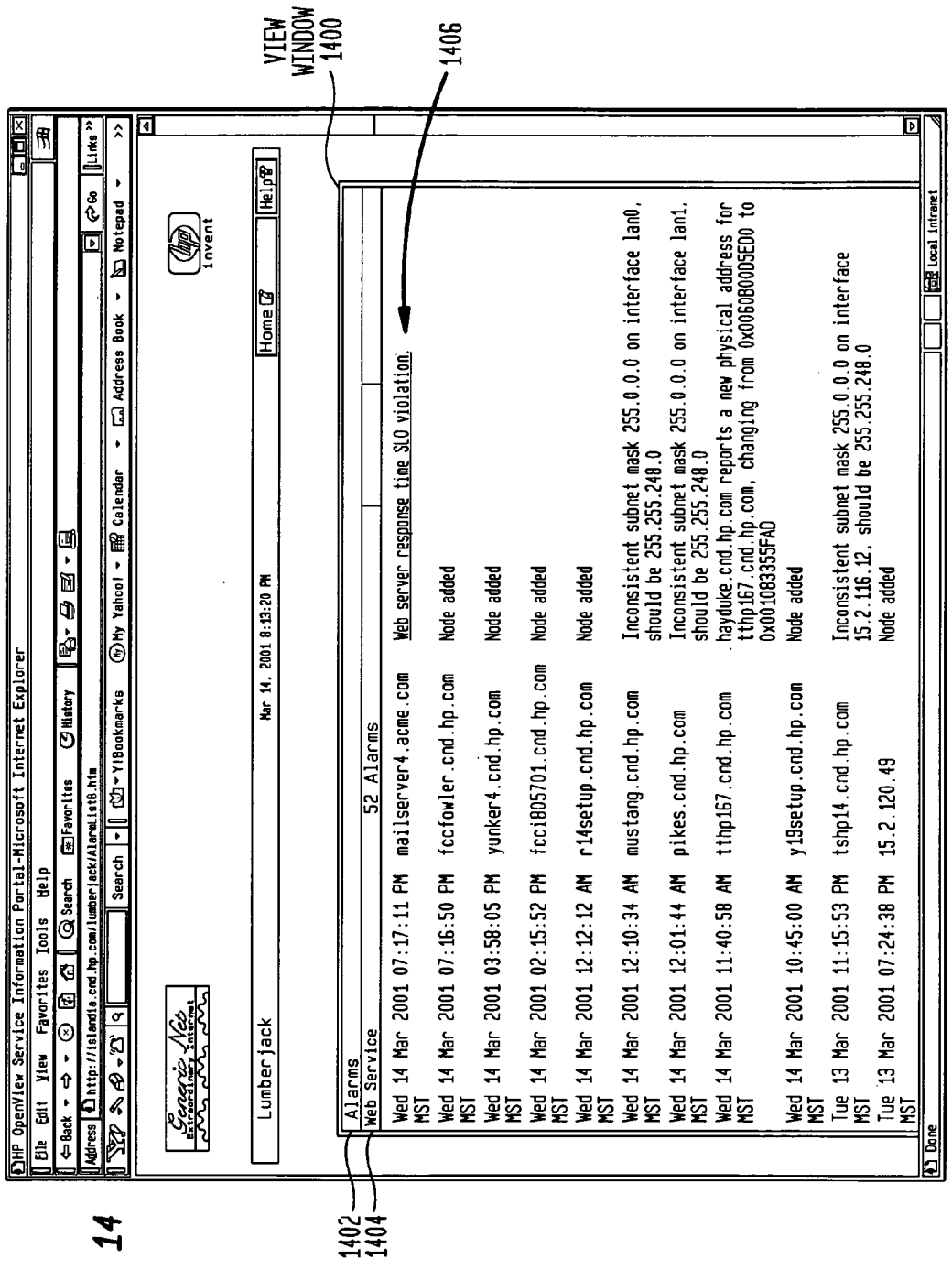
FIG. 14 is an illustration of a graphical user interface display window showing another example of a problem event list generated by the troubleshooting mentor of the present invention.
Figure 15:
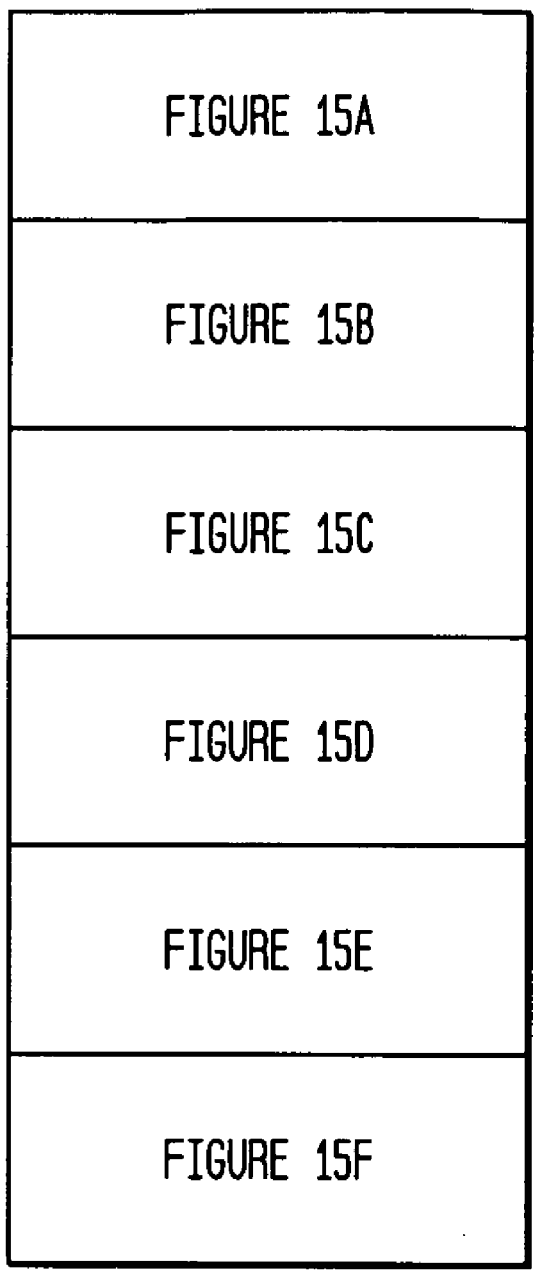
FIG. 15 is an illustration of the relationship between FIGS. 15A–15F.
Figure 16A:
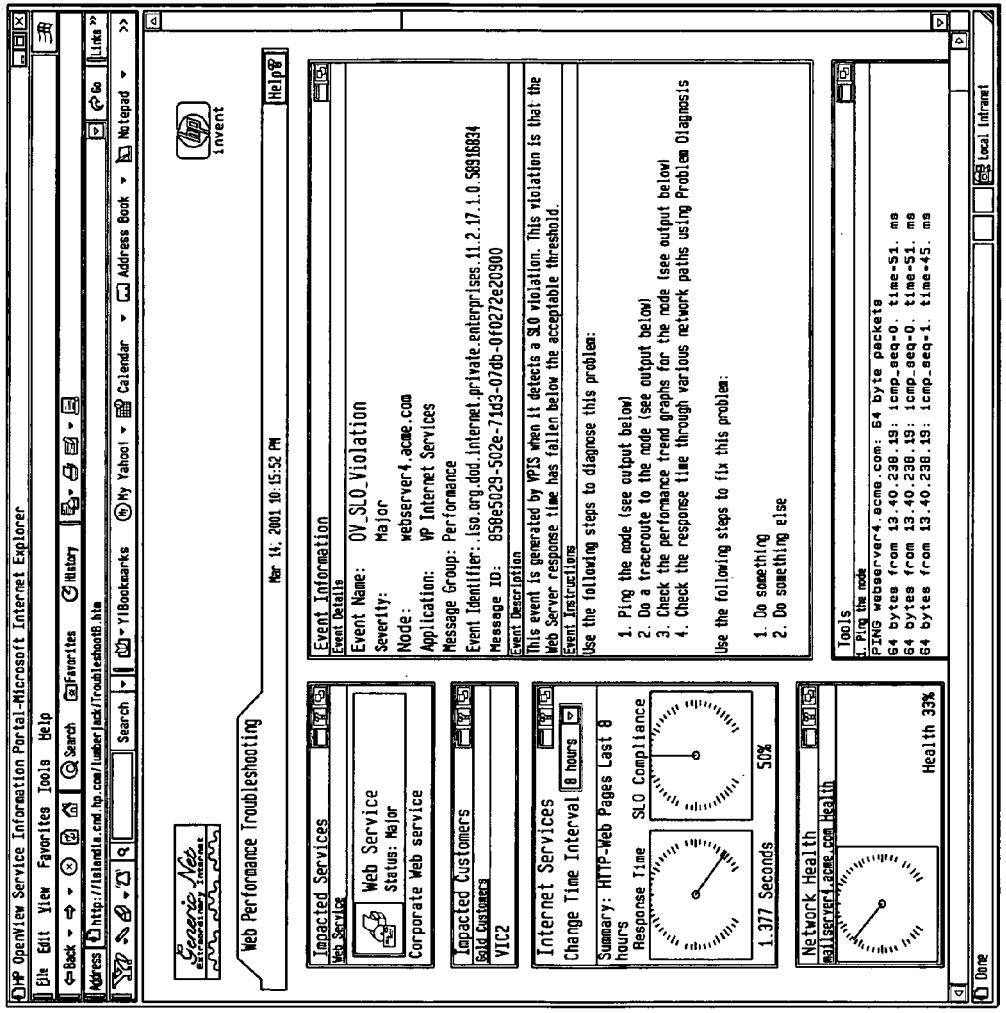
FIGS. 16A–16E together illustrate a troubleshooting view window displayed in response to the execution of the TS profile illustrated in FIGS. 15A–15F in accordance with one embodiment of the present invention.
Figure 16B:
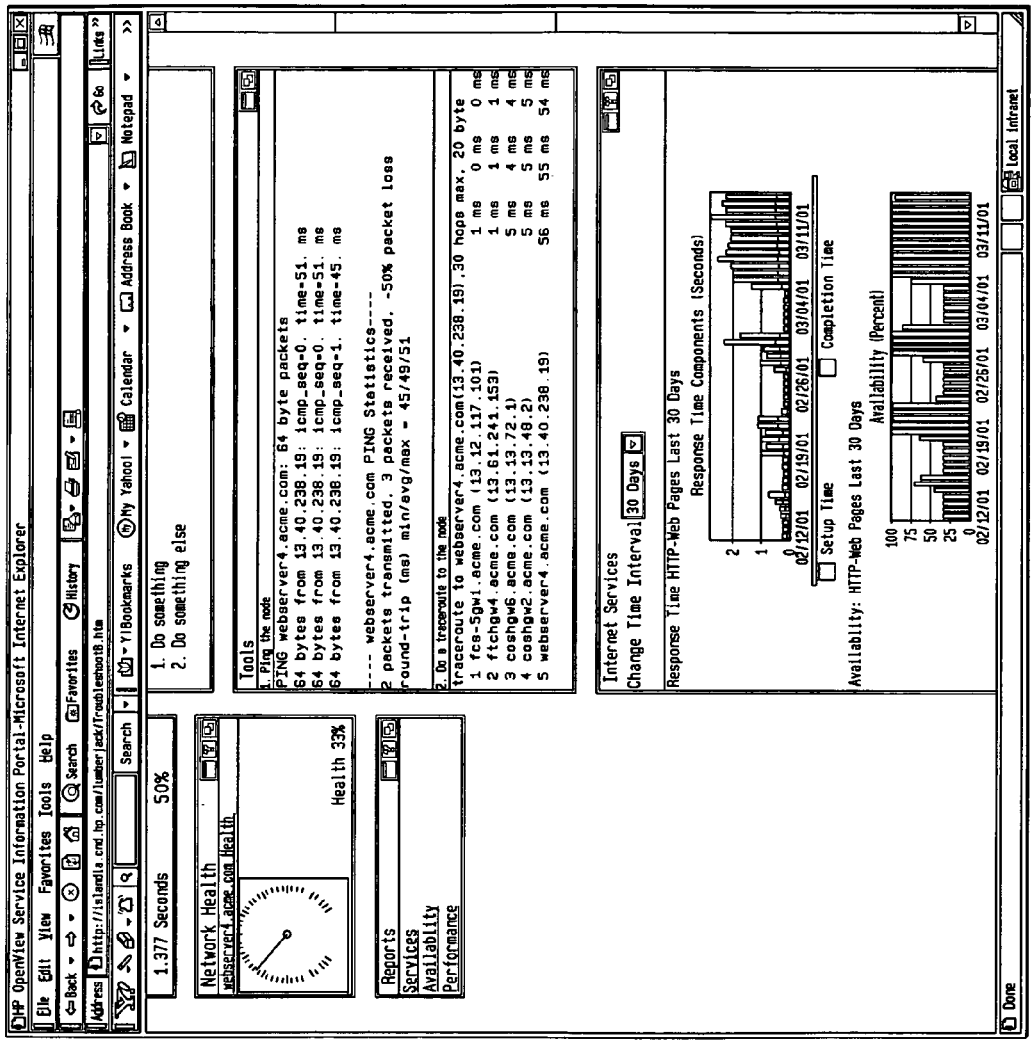
Figure 16C:
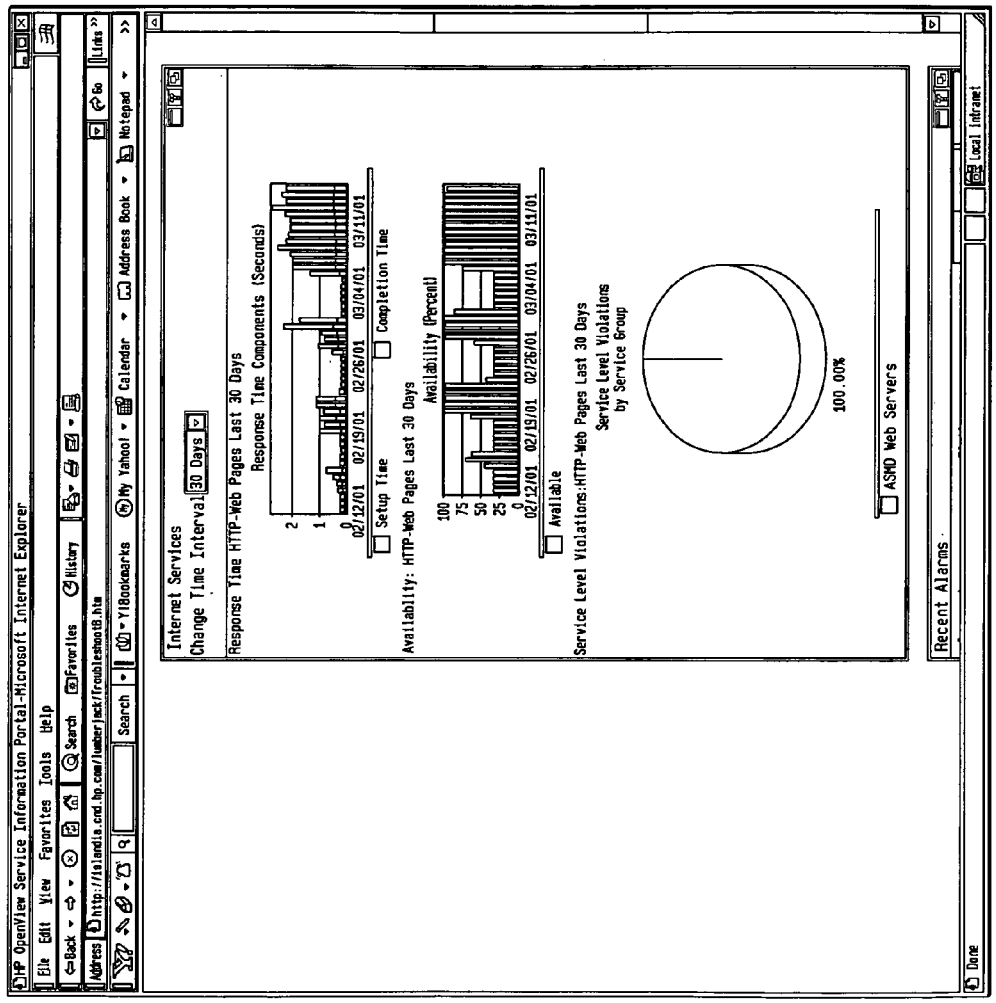
Figure 16D:
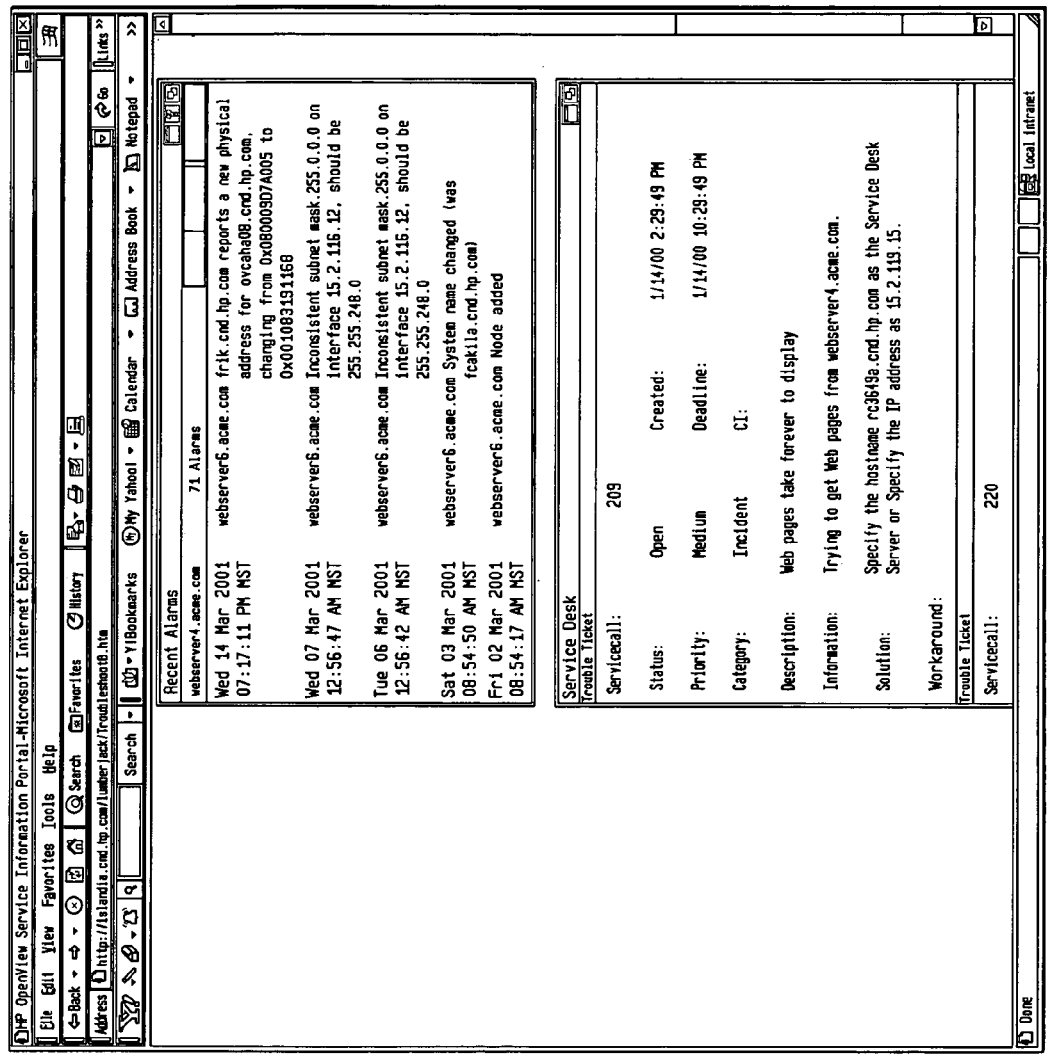
Figure 16E:
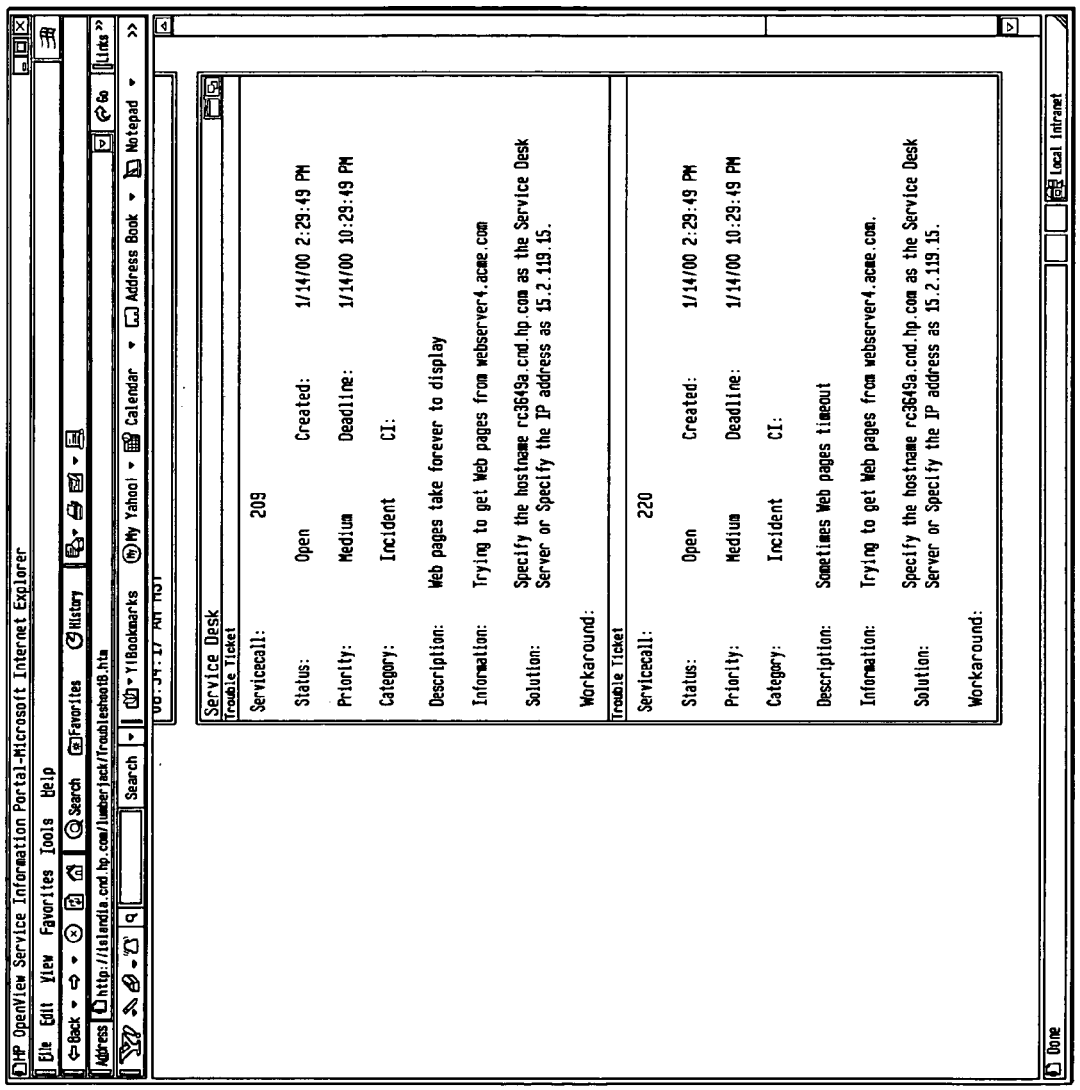

FIG. 14 is an illustration of a graphical user interface display window displayed by problem event GUI 210 to display a problem event list 213 generated by problem event processor 202. Event list display window 1400 is titled "Alarms" 1402 and provides problem events 201 listed according to category. In this illustrative example, the problem events 201 associated with the web service are displayed. A subtitle line 1404 is included in view window 1400 to identify the category of the displayed problem events 201. As shown in subtitle bar 1404, the number of problem events ("52 Alarms") is displayed in addition to the category identifier ("Web Service").

For each problem event 201, the three data values noted above with reference to FIG. 11 are provided in row-adjacent manner. Of the displayed problem events, the network administrator selects the first problem event 1406 in the displayed problem event list 213. This selected problem event occurred at the node "webserver4.acme.com" on Mar. 14, 2001, 07:17:11PM MST. The problem event is referred to as "Web server response time SLO violation."

In response to this problem event selection 215, TS profile 1500 illustrated in FIGS. 15A–15F is implemented; that is, TS profile 1500 is populated and provided to portal view manager 206 as populated TS profile 205. The relationship between FIGS. 15A–15F is illustrated in FIG. 15. This particular TS profile 1500 is in XML format. FIGS. 16A–16E are illustrations of different portions of a TS view window 1600 generated by troubleshooting portal view manager 206 when implementing TS profile 1500. TS profile 1500 and TS view window 1600 are similar to TS profile 1200 and TS view window 1300 described in detail below and, based on the disclosure thereof, should be understood by those of ordinary skill in the relevant art.

Further features of the invention are described in commonly-owned U.S. patent application Ser. No. 09/845,427 entitled "A PORTAL SYSTEM AND METHOD FOR MANAGING RESOURCES IN A NETWORKED COMPUTING ENVIRONMENT", filed on Apr. 30, 2001, and U.S. patent application Ser. No. 09/845,430 entitled "SYSTEM AND METHOD FOR MANAGING DATA MINER MODULES IN AN INFORMATION NETWORK SYSTEM", filed on Apr. 30, 2001, the specifications of which are hereby incorporated by reference herein in their entirety.

IV. Closing

While various embodiments of the present invention have been described above, it should be understood that they have been presented by way of example only, and not limitation. For example, there is a troubleshooting profile 205 that corresponds with each type of problem event 201. In alternative embodiments, the association between troubleshooting profiles 205 and problem events 201 can take on any arrangement. For example, there may be a one-to-one correspondence. As another example, the troubleshooting data miner modules are referenced in troubleshooting profiles 205. In alternative embodiments, troubleshooting profiles 205 can include the functionality; that is, the code, included in the referenced troubleshooting data miner modules. However, such an embodiment would result in some redundancy and, therefore, is not preferred over the disclosed embodiment. Another example is the form in which data is stored. In the exemplary embodiment, LUTs and databases are utilized. It should be understood that any type of data repository can be utilized. Similarly, the transfer of information between components of the invention as well as between the invention and external entities can be accomplished through any well known technique. For example, individual signals over data and control lines, data buses over which encoded information, shared libraries, and the like can be used to transfer information. In addition, the computer programs noted above may exist in a variety of forms both active and inactive. For example, the computer programs can exist as application-level software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general. It should also be understood that the methods described above are exemplary only, and that the operations, processes and steps of the method may be performed in a different order than illustrated or may be performed concurrently to the extent possible given data limitations. Thus, the breadth and the scope of the present invention are not limited by any of the above exemplary embodiments, but are defined only in accordance with the following claims and their equivalents.

What is claimed is:

1. A system for automatically providing an administrator of a computing environment with diagnostic data and instructions relevant to troubleshooting a selected problem event occurring in the computing environment, wherein said system comprises:

a problem event processor operable to cause a plurality of problem events to be displayed, receive a problem event selection identifying one of the plurality of problem events as the selected problem event, and determine which of a plurality of troubleshooting types corresponds to said selected problem event;

a troubleshooting profile manager operable to select a troubleshooting profile associated with said troubleshooting type of said selected problem event; and a troubleshooting portal view manager operable to execute said troubleshooting profile and one or more troubleshooting data miner modules referenced in said troubleshooting profile, and to cause said diagnostic data and said instructions to be displayed; wherein when executed said one or more troubleshooting data miner modules generate or cause generation of said diagnostic data and said instructions.

2. The system of claim 1, wherein upon selection of said selected problem event, said system automatically retrieves from relevant computing environment entities said diagnostic data.

3. The system of claim 1, wherein said selected problem event is one of a plurality of problem events generated by at least one domain manager in the computing environment, each said at least one domain manager managing an entity in the computing environment.

4. The system of claim 1, wherein said data miner modules comprise a first data miner module operable to generate or cause the generation of said instructions, and wherein said troubleshooting portal view manager is operable to display said instructions produced by execution of said first data miner module.

5. The system of claim 3, wherein said computing environment includes a network system, and wherein said at least one domain manager comprises one or more of the group consisting of:
  network managers configured to manage individual and collections of networks;
  software application managers configured to manage software applications executing on a node or server of the computing environment;
  database managers configured to manage databases executing on a node or server of the network system; and
  server managers configured to assist a network administrator in managing operations of each server in a network.

6. The system of claim 1, wherein said problem event processor is further operable to normalize said plurality of problem events for display.

7. The system of claim 3, wherein said diagnostic data is displayed in accordance with viewpoint layout information included in said troubleshooting profile.

8. The system of claim 3, wherein said plurality of problem events comprise:
  problem events automatically-generated by said at least one domain manager; and
  problem events identified by a user of the computing environment and manually entered into said system.

9. The system of claim 1, wherein said display of said diagnostic data can be modified by administrator inputs specifying a change in said diagnostic data, and wherein said troubleshooting portal view manager is further operable to access said domain managers as necessary to obtain or cause the generation of said modified diagnostic data.

10. The system of claim 1, wherein said problem event processor is further operable to generate event data associated with said selected problem event, said event data comprising:
  an original event ID generated by a domain manager that manages an entity of the computing device that caused said problem event to occur;
  said troubleshooting type of said selected problem event; and
  information pertaining to said entity that caused the generation of said problem event.

11. The system of claim 1, wherein said problem event processor comprises:
  an event consolidator operable to receive problem events from domain managers, said problem events generated by different domain managers having different formats, said event consolidator operable to process said problem events and, in response to each received problem event, to generate a normalized event identifier having a standard format; and
  an event type determinator operable to categorize received problem events as being one of a plurality of troubleshooting types, each said troubleshooting type indicating diagnostic data and troubleshooting procedures likely to be required to be performed or analyzed to successfully troubleshoot each said problem event, and to generate said troubleshooting type for said selected problem event.

12. The system of claim 1, wherein said problem event processor comprises:
  an event consolidator operable to receive problem events from domain managers and that generate a representation of the selected problem event, said representation including said troubleshooting type.

13. The system of claim 10, wherein said troubleshooting profile manager comprises:
  a repository of troubleshooting profiles each associated with a particular troubleshooting type of problem event;
  repository of mapping data that associates each said troubleshooting type and one of said troubleshooting profiles;
  a profile selector that, based on said troubleshooting type of said selected problem event, is operable to retrieve from said repository one of said troubleshooting profiles that is to be implemented for said selected problem event; and
  a profile conditioner operable to populate said troubleshooting profile with at least a portion of said event data.

14. The system of claim 1, wherein said troubleshooting profile is an extensible, executable software program that is operable to invoke a predetermined combination of at least one of said one or more data miners that generate or cause the generation of said diagnostic data and instructions to assist the administrator in diagnosing and correcting a cause of said selected problem event.

15. The system of claim 13, wherein said repository of mapping data is a look-up-table.

16. The system of claim 13, wherein said troubleshooting profile manager further comprises:
  a troubleshooting profile editor operable to enable the administrator to modify, add or delete contents of said mapping data and said repository of said troubleshooting profiles.

17. The system of claim 13, wherein each said troubleshooting profile comprises:
  portal view layout information for use by said troubleshooting portal view manager to generate a TS view window;
  one or more references to said one or more troubleshooting data miner modules that are to be utilized to obtain said diagnostic data and instructions relevant to troubleshooting said selected problem event; and
  troubleshooting data miner module configuration information parameters that provide requisite information to said one or more referenced troubleshooting data miner modules.

18. The system of claim 1, wherein said troubleshooting portal view manager comprises:
a database of said one or more troubleshooting data miner modules;
a data miner manager operable to invoke at least one of said one or more troubleshooting data miner modules referenced in said troubleshooting profile; and
a portal view window generator operable to display said diagnostic data and said troubleshooting instructions generated by said referenced data miner modules in accordance with portal view layout information contained within said troubleshooting profile.

19. The system of claim 18, wherein said troubleshooting data miner modules are executable software programs that, when executed, access, call, query, or otherwise interface with external entities to retrieve or cause the generation of diagnostic data and troubleshooting instructions.

20. The system of claim 1, wherein said one or more troubleshooting data miner modules comprise one or more of the group consisting of:
software programs operable to mine data from said at least one domain manager;
software programs operable to access knowledge databases provided by a customer of the computing environment; and
software programs operable to call or invoke system utilities and tools that, when executed, generate said diagnostic data.

21. The system of claim 1, wherein said computing environment comprises a distributed network system.

22. An apparatus that displays instructions and diagnostic data relevant to the diagnosis of a particular problem event which has occurred in a computing environment, wherein said instructions and diagnostic data are generated automatically and without network administrator action subsequent to identifying said particular problem event; wherein the apparatus comprises:
a database of troubleshooting data miner modules each configured to generate or cause the generation of one or more of either instructions and diagnostic data;
a repository of troubleshooting profiles each referencing one or more data miner modules;
a memory device configured to store data that associates problem event types with troubleshooting profiles; and
a troubleshooting software module operable to display problem events received from domain managers, to execute a troubleshooting profile retrieved from said repository of troubleshooting profiles that is associated with said particular problem event to cause invocation of said one or more referenced troubleshooting data miner modules, and to display said diagnostic data and said instructions generated or caused to be generated by said one or more referenced troubleshooting data miner modules.

23. A method for displaying information relevant to a particular problem event which has occurred in a computing environment, comprising:
providing a database of troubleshooting data miner modules each operable to generate or cause the generation of diagnostic data or instructions related to a particular network entity or function;
generating a database of troubleshooting profiles each referencing a predetermined one or more troubleshooting data miner modules to display diagnostic data and instructions pertinent to a particular type of problem event;
determining which type of problem event corresponds to said particular problem event;
retrieving from said database of troubleshooting profiles a troubleshooting profile associated with said determined type of problem event; and
invoking said retrieved troubleshooting profile and said one or more troubleshooting data miner modules referenced therein to generate or cause to be generated diagnostic data and instruction relevant to the particular problem event; and
displaying said instructions and diagnostic data on a display device.

24. The method of claim 23, further comprising:
receiving a plurality of problem events each generated by a domain manager residing in the computing environment;
storing said received problem events in a repository of problem events that have occurred in the computing environment;
displaying a representation of said plurality of stored problem events in an interactive display; and
receiving an indication that one of the plurality of problem events is said particular problem event.

25. A computer readable medium comprising:
a database of troubleshooting data miner modules each configured to generate or cause generation of at least one of either troubleshooting instructions and diagnostic data;
a repository of troubleshooting profiles each referencing at least one of said data miner modules to be used in connection with troubleshooting a particular type of problem event; and
a memory device configured to store data that associates each problem event type with one of the troubleshooting profiles; and
computer program logic operable to enable a processor of a computer system to display problem events received from domain managers in a computing environment, determine the type of a problem event selected by a user, retrieve a troubleshooting profile from said repository that is associated with said type, execute said retrieved troubleshooting profile causing the invocation of said referenced troubleshooting data miner modules, and display diagnostic data and troubleshooting instructions generated or caused to be generated by said referenced troubleshooting data miner modules.

* * * * *